United States Patent
Nishizawa

(10) Patent No.: US 9,948,831 B2
(45) Date of Patent: Apr. 17, 2018

(54) IN/OUT-OF-GAMUT DETERMINATION SYSTEM FOR ACQUIRING CROSS-SECTION OF COLOR GAMUT OF IMAGE FORMING APPARATUS TAKEN ON SPECIFIC PLANE

(71) Applicant: KYOCERA Document Solutions Inc., Osaka (JP)

(72) Inventor: Akira Nishizawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/250,454

(22) Filed: Aug. 29, 2016

(65) Prior Publication Data
US 2017/0064152 A1    Mar. 2, 2017

(30) Foreign Application Priority Data

Aug. 31, 2015   (JP) .................... 2015-170576
Aug. 31, 2015   (JP) .................... 2015-170579

(51) Int. Cl.
*H04N 1/64* (2006.01)
*H04N 1/60* (2006.01)

(52) U.S. Cl.
CPC ........... *H04N 1/646* (2013.01); *H04N 1/6061* (2013.01); *H04N 1/6075* (2013.01); *H04N 2201/0039* (2013.01); *H04N 2201/0094* (2013.01)

(58) Field of Classification Search
CPC .... H04N 1/646; H04N 1/6058; H04N 1/6061; H04N 1/6075
See application file for complete search history.

(56) References Cited

FOREIGN PATENT DOCUMENTS

JP    2007-281614 A    10/2007

*Primary Examiner* — Christopher D Wait
(74) *Attorney, Agent, or Firm* — Studebaker & Brackett PC

(57) ABSTRACT

A color gamut cross-section acquiring method for acquiring a cross-section of a color gamut of an image forming apparatus taken on a specific plane includes: acquiring color gamut boundary line segments; acquiring intersection points between the color gamut boundary line segments and the specific plane; acquiring a shortest possible route passing through each of the intersection points exactly once; acquiring each of line segments making up the route as a provisional cross-section boundary line segment; acquiring a set of verification line segments by connecting intersection points between the color gamut boundary line segments and a plane intersecting with the provisional cross-section boundary line segment at a point other than the endpoints of the provisional cross-section boundary line segment; and acquiring the provisional cross-section boundary line segment as a cross-section boundary line segment if the provisional cross-section boundary line segment intersects with the set of verification line segments.

3 Claims, 34 Drawing Sheets

IN/OUT-OF-GAMUT DETERMINATION SYSTEM FOR ACQUIRING CROSS-SECTION OF COLOR GAMUT OF IMAGE FORMING APPARATUS TAKEN ON SPECIFIC PLANE

INCORPORATION BY REFERENCE

The present application claims priority under 35 U.S.C. § 119 to Japanese Patent Application No. 2015-170576, filed on Aug. 31, 2015 and Japanese Patent Application No. 2015-170579, filed on Aug. 31, 2015. The contents of these applications are incorporated herein by reference in their entirety.

BACKGROUND

The present disclosure relates to a color gamut cross-section acquiring method for acquiring a cross-section of a color gamut of an image forming apparatus taken on a specific plane, a storage medium that stores therein a color gamut cross-section acquisition program for acquiring a cross-section of a color gamut of an image forming apparatus taken on a specific plane, and a color gamut cross-section acquiring device for acquiring a cross-section of a color gamut of an image forming apparatus taken on a specific plane.

A known color gamut cross-section acquiring method acquires a cross-section of a color gamut of a printer taken on a plane of constant lightness. A typical color gamut cross-section acquiring method includes acquiring line segments serving as line segments for defining a boundary of the color gamut of the printer. The typical color gamut cross-section acquiring method also includes acquiring points of intersection between the acquired line segments and the plane of constant lightness. The typical color gamut cross-section acquiring method takes an average value of all the acquired intersection points as a center point. The typical color gamut cross-section acquiring method then acquires line segments by connecting the center point with each of the intersection points and uses one of the thus acquired line segments as a reference (0°) to determine an angle of each of the line segments to the reference on an intersection point by intersection point basis. Next, line segments are acquired by connecting the intersection points in decreasing order of the angle. Subsequently, a cross-section is acquired based on the line segments connecting the intersection points.

SUMMARY

A color gamut cross-section acquiring method according to an aspect of the present disclosure is a method for acquiring a cross-section of a color gamut of an image forming apparatus taken on a specific plane. The color gamut cross-section acquiring method according to the aspect of the present disclosure includes acquiring color gamut boundary line segments, acquiring cross-section boundary line segments, and acquiring intersection points. The acquiring color gamut boundary line segments is acquiring color gamut boundary line segments that are line segments for defining a boundary of the color gamut. The acquiring cross-section boundary line segments is acquiring cross-section boundary line segments that are line segments for defining a boundary of the cross-section. The acquiring intersection points is acquiring, as endpoints of the cross-section boundary line segments, intersection points between the color gamut boundary line segments and the specific plane. The acquiring cross-section boundary line segments includes: acquiring a shortest possible route passing through each of the intersection points acquired as the endpoints exactly once; acquiring each of line segments making up the route as a provisional cross-section boundary line segment; acquiring a set of verification line segments by connecting intersection points between the color gamut boundary line segments and a plane intersecting with the provisional cross-section boundary line segment at a point other than the endpoints of the provisional cross-section boundary line segment; and acquiring the provisional cross-section boundary line segment as a cross-section boundary line segment if the provisional cross-section boundary line segment intersects with the set of verification line segments.

A storage medium according to another aspect of the present disclosure is a non-transitory computer-readable storage medium storing a color gamut cross-section acquisition program executable by a computer for acquiring a cross-section of a color gamut of an image forming apparatus taken on a specific plane. The color gamut cross-section acquisition program includes first to third program codes. The first program code causes the computer to acquire color gamut boundary line segments that are line segments for defining a boundary of the color gamut. The second program code causes the computer to acquire cross-section boundary line segments that are line segments for defining a boundary of the cross-section. The third program code causes the computer to acquire, as endpoints of the cross-section boundary line segments, intersection points between the color gamut boundary line segments and the specific plane. The second program code includes fourth to seventh program codes. The fourth program code causes the computer to acquire a shortest possible route passing through each of the intersection points acquired as the endpoints exactly once. The fifth program code causes the computer to acquire each of line segments making up the route as a provisional cross-section boundary line segment. The sixth program code causes the computer to acquire a set of verification line segments by connecting intersection points between the color gamut boundary line segments and a plane intersecting with the provisional cross-section boundary line segment at a point other than the endpoints of the provisional cross-section boundary line segment. The seventh program code causes the computer to acquire the provisional cross-section boundary line segment as a cross-section boundary line segment if the provisional cross-section boundary line segment intersects with the set of verification line segments.

A color gamut cross-section acquiring device according to another aspect of the present disclosure acquires a cross-section of a color gamut of an image forming apparatus taken on a specific plane. The color gamut cross-section acquiring device according to the aspect of the present disclosure includes a storage device and a controller. The storage device stores therein a color gamut cross-section acquisition program. The controller executes the color gamut cross-section acquisition program. By executing the color gamut cross-section acquisition program, the controller: acquires color gamut boundary line segments that are line segments for defining a boundary of the color gamut; acquires cross-section boundary line segments that are line segments for defining a boundary of the cross-section; and acquires, as endpoints of the cross-section boundary line segments, intersection points between the color gamut boundary line segments and the specific plane. For acquiring the cross-section boundary line segments, the controller: acquires a shortest possible route passing through each of the intersection points acquired as the endpoints exactly once; acquires each of line segments making up the route as a provisional cross-section boundary line segment; acquires a set of verification line segments by connecting intersection points between the color gamut boundary line segments and a plane intersecting with the provisional cross-section boundary line segment at a point other than the endpoints of the provisional cross-section boundary line segment; and acquires the provisional cross-section boundary line segment as a cross-section boundary line segment if the provisional cross-section boundary line segment intersects with the set of verification line segments.

DETAILED DESCRIPTION

Figure 1:
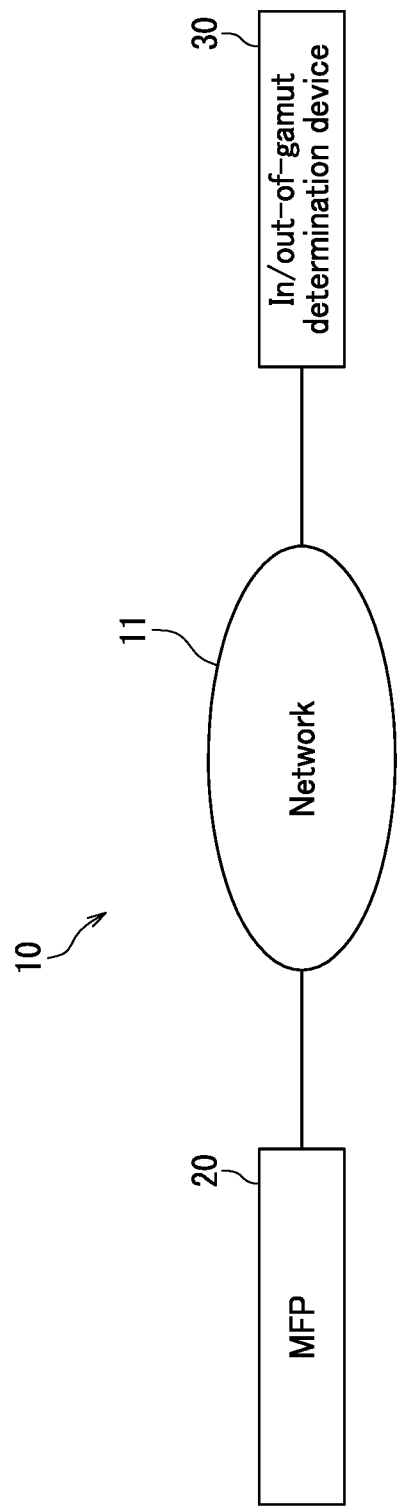
FIG. 1 is a diagram illustrating a block configuration of an in/out-of-gamut determination system according to a first embodiment of the present disclosure.

The following describes embodiments of the present disclosure using the accompanying drawings. Note that in the drawings, elements that are the same or equivalent are labelled using the same reference signs and description thereof is not repeated.

First Embodiment

First, a configuration of an in/out-of-gamut determination system according to a first embodiment will be described.

FIG. 1 is a diagram illustrating a block configuration of an in/out-of-gamut determination system 10 according to the first embodiment.

As illustrated in FIG. 1, the in/out-of-gamut determination system 10 includes a multifunction peripheral (MFP) 20 and an in/out-of-gamut determination device 30.

The MFP 20 is an example of an image forming apparatus. The in/out-of-gamut determination device 30 determines whether a specified chromaticity value is inside or outside a color gamut of the MFP 20. The MFP 20 and the in/out-of-gamut determination device 30 are connected via a network 11 such as a local area network (LAN) and the Internet so as to be communicable with one another.

Chromaticity values are numerical values representing colors in a device-independent color space. Examples of device-independent color spaces include an XYZ color space and a Lab color space. Hereinafter, the embodiments of the present disclosure will be described using the Lab color space as an example. However, the color space is not limited to the Lab color space. The color space may be other device-independent color spaces such as the XYZ color space.

Figure 2:
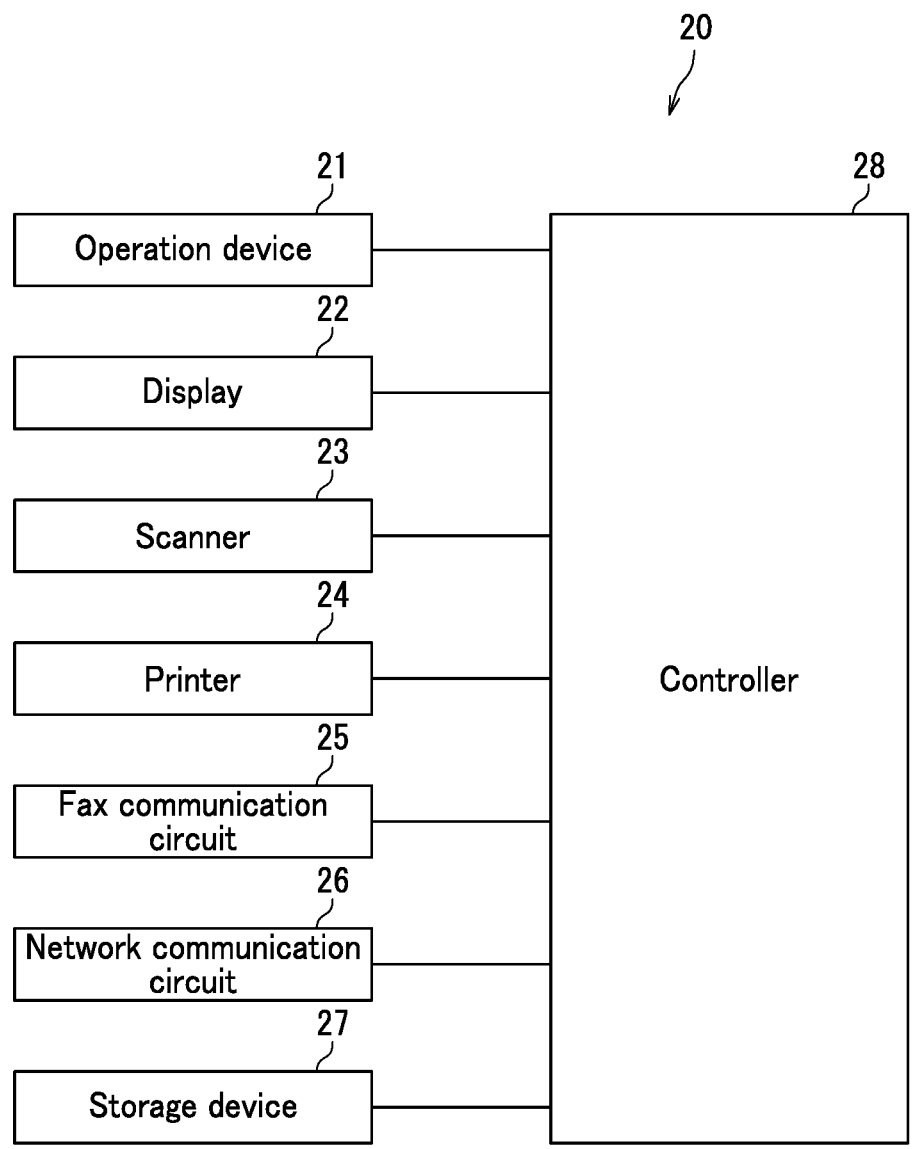
FIG. 2 is a diagram illustrating a block configuration of a multifunction peripheral (MFP) illustrated in FIG. 1.

FIG. 2 is a diagram illustrating a block configuration of the MFP 20.

As illustrated in FIG. 2, the MFP 20 includes an operation device 21, a display 22, a scanner 23, a printer 24, a fax communication circuit 25, a network communication circuit 26, a storage device 27, and a controller 28.

The operation device 21 may be an input device such as buttons. The input device inputs various instructions. The operation device 21 for example includes buttons.

The display 22 may be a display device such as a liquid crystal display (LCD). The display device displays various types of information. The display 22 is for example an LCD.

The scanner 23 may be a reading device that reads an image.

The printer 24 may be a printing device that performs printing on a recording medium such as paper.

The fax communication circuit 25 is a facsimile device that performs fax communication with external facsimile devices, not illustrated, via a communication line such as a public telephone line.

The network communication circuit 26 may be a communication device that performs communication with external devices via the network 11 (see FIG. 1). The external devices include at least the in/out-of-gamut determination device 30 (see FIG. 1).

The storage device 27 stores various types of data therein. The storage device 27 may be semiconductor memory or a hard disk drive (HDD). The storage device 27 for example includes either or both of semiconductor memory and an HDD.

The controller 28 performs overall control of the MFP 20. The controller 28 is for example a processor such as a microprocessor. The controller 28 for example includes a central processing unit (CPU), read only memory (ROM), and random access memory (RAM). A program and various types of data are stored in the ROM. The RAM is used as a work area of the CPU. The CPU executes a program stored in the ROM or the storage device 27.

Figure 3:
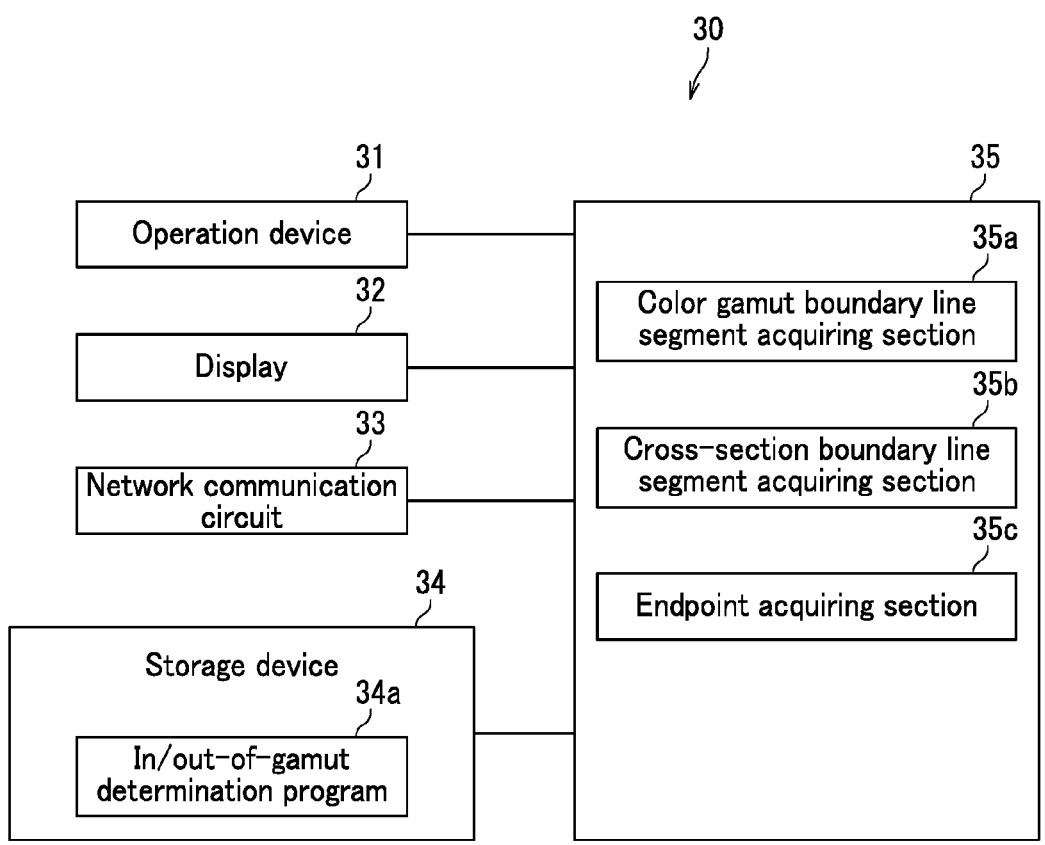
FIG. 3 is a diagram illustrating a block configuration of an in/out-of-gamut determination device illustrated in FIG. 1.

FIG. 3 is a diagram illustrating a block configuration of the in/out-of-gamut determination device 30.

As illustrated in FIG. 3, the in/out-of-gamut determination device 30 includes an operation device 31, a display 32, a network communication circuit 33, a storage device 34, and a controller 35. The in/out-of-gamut determination device 30 is for example implemented by a computer such as a personal computer (PC).

The operation device 31 may be an input device such as a mouse or a keyboard. The input device inputs various instructions. The operation device 31 for example includes either or both of a mouse and a keyboard.

The display 32 may be a display device such as an LCD. The display device displays various types of information. The display 32 is for example an LCD.

The network communication circuit 33 may be a communication device that performs communication with external devices via the network 11 (see FIG. 1). The external devices include at least the MFP 20 (see FIG. 1).

The storage device 34 stores a program and various types of data therein. The storage device 34 may be an HDD. The storage device 34 for example includes an HDD.

The controller 35 performs overall control of the in/out-of-gamut determination device 30.

The storage device 34 stores therein an in/out-of-gamut determination program 34a for determining whether a specified chromaticity value is inside or outside the color gamut of the MFP 20. The in/out-of-gamut determination program 34a can be installed on the in/out-of-gamut determination device 30 during production of the in/out-of-gamut determination device 30. Alternatively, the in/out-of-gamut determination program 34a can be additionally installed on the in/out-of-gamut determination device 30 from an external storage medium such as a compact disk (CD), a digital versatile disk (DVD), or a universal serial bus (USB) memory device. Alternatively, the in/out-of-gamut determination program 34a can be additionally installed on the in/out-of-gamut determination device 30 via the network 11.

The controller 35 is for example a processor such as a microprocessor. The controller 35 for example includes a CPU, ROM and RAM. A program and various types of data are stored in the ROM. The RAM is used as a work area of the CPU. The CPU executes a program stored in the ROM or the storage device 34.

The in/out-of-gamut determination program 34a is part of a color gamut cross-section acquisition program for acquiring a cross-section of the color gamut of the MFP 20 taken on a specific plane. Accordingly, the in/out-of-gamut determination device 30 is part of a color gamut cross-section acquiring device that acquires a cross-section of the color gamut of the MFP 20 taken on a specific plane. More specifically, the controller 35 functions as a color gamut boundary line segment acquiring section 35a, a cross-section boundary line segment acquiring section 35b, and an endpoint acquiring section 35c by executing the in/out-of-gamut determination program 34a stored in the storage device 34.

The color gamut boundary line segment acquiring section 35a (controller 35) acquires a boundary of the color gamut of the MFP 20. In other words, the color gamut boundary line segment acquiring section 35a acquires a plurality of line segments for defining an outermost shell of the color gamut of the MFP 20. Hereinafter, the line segments for defining the outermost shell of the color gamut of the MFP 20 will be referred to as "color gamut boundary line segments".

The cross-section boundary line segment acquiring section 35b (controller 35) acquires a plurality of line segments for defining a boundary of a cross-section of the color gamut of the MFP 20 taken on a specific plane. Hereinafter, a boundary of a cross-section of the color gamut of the MFP 20 taken on a specific plane is referred to as "a cross-section boundary". The line segments for defining the cross-section boundary are referred to as "cross-section boundary line segments". The endpoint acquiring section 35c (controller 35) acquires opposite end points of each cross-section boundary line segment.

The following describes operation of the in/out-of-gamut determination system 10.

Figure 4:
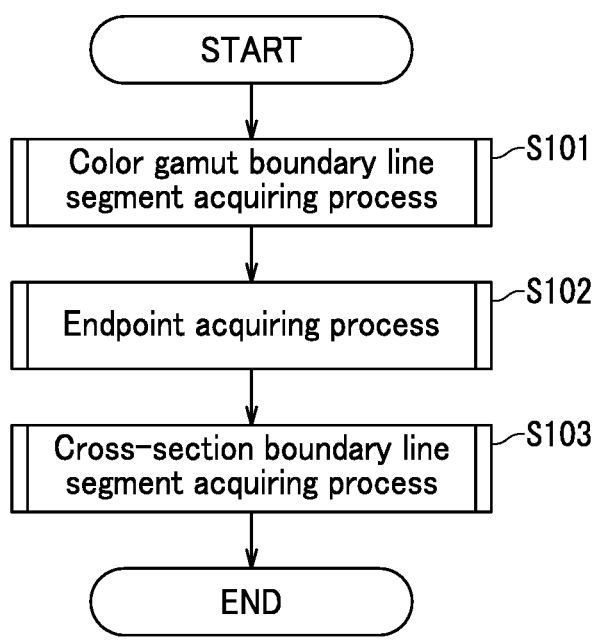
FIG. 4 is a flowchart of operation of the in/out-of-gamut determination device illustrated in FIG. 3.

FIG. 4 is a flowchart of operation of the in/out-of-gamut determination device 30. More specifically, FIG. 4 illustrates operation of acquiring a cross-section of the color gamut of the MFP 20.

As illustrated in FIG. 4, the color gamut boundary line segment acquiring section 35a performs a color gamut boundary line segment acquiring process of acquiring color gamut boundary line segments (Step S101).

Figure 5:
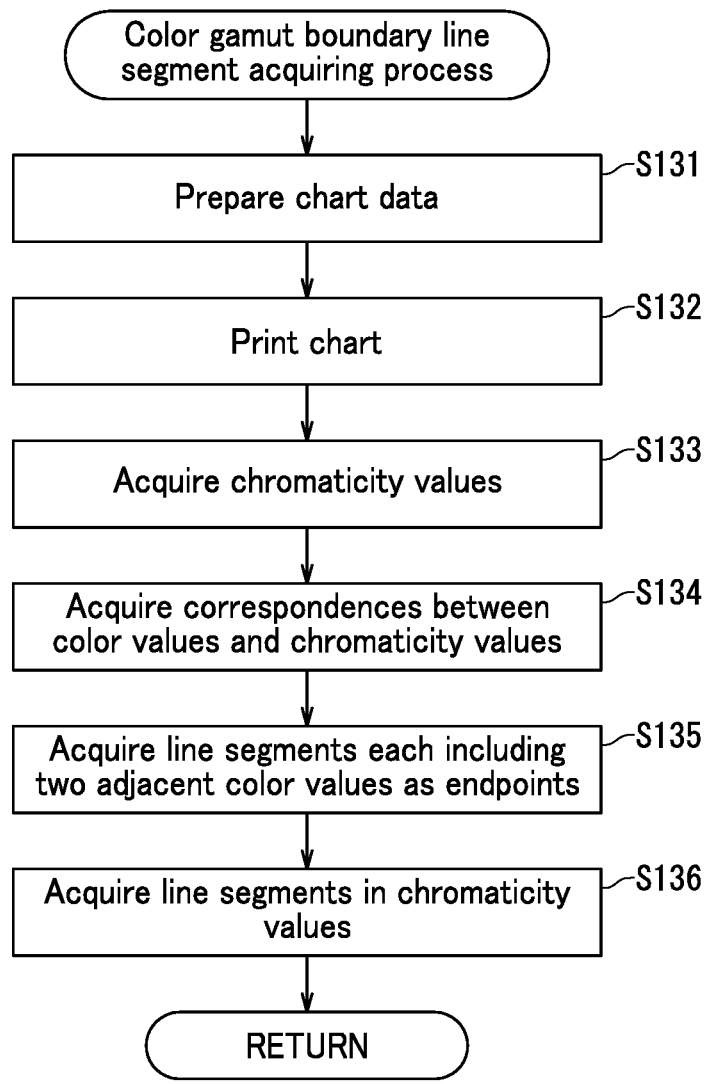
FIG. 5 is a flowchart of a color gamut boundary line segment acquiring process illustrated in FIG. 4.

FIG. 5 is a flowchart of the color gamut boundary line segment acquiring process in FIG. 4.

As illustrated in FIG. 5, the color gamut boundary line segment acquiring section 35a prepares data of a chart to be printed by the MFP 20 (Step S131). The chart contains patches of different colors to be printed by the MFP 20. The data of the chart indicates the colors of the patches using color values that are input into the MFP 20. The data of the chart includes at least patches of colors of the outermost shell of the color gamut of the MFP 20. More specifically, the data of the chart includes only patches of the colors of the outermost shell of the color gamut of the MFP 20. Alternatively, the data of the chart includes patches of the colors of the outermost shell of the color gamut of the MFP 20 and patches of colors other than the colors of the outermost shell of the color gamut of the MFP 20.

Note that color values are numerical values representing colors in device-dependent color spaces. Examples of device-dependent color spaces include an RGB color space and a CMYK color space. The RGB color space and the CMYK color space are well-known color spaces used for color values that are input into image forming apparatuses. Hereinafter, the embodiments of the present disclosure will be described using the RGB color space as an example. However, the color space is not limited to the RGB color space. The color space may be other device-dependent color spaces such as the CMYK color space.

First, description is given of a case where the color gamut boundary line segment acquiring section 35a prepares data of a chart including only patches of the colors of the outermost shell of the color gamut of the MFP 20 in Step S131.

When a value of any one of an R channel, a G channel, and a B channel for an RGB value (color value) is a minimum value or a maximum value of an input range in a case where the color space for color values input into the MFP 20 is an RGB color space, the RGB value manifests as a point included in the outermost shell of the color gamut regardless of values of the other channels of the R channel, the G channel, and the B channel.

Figure 6:
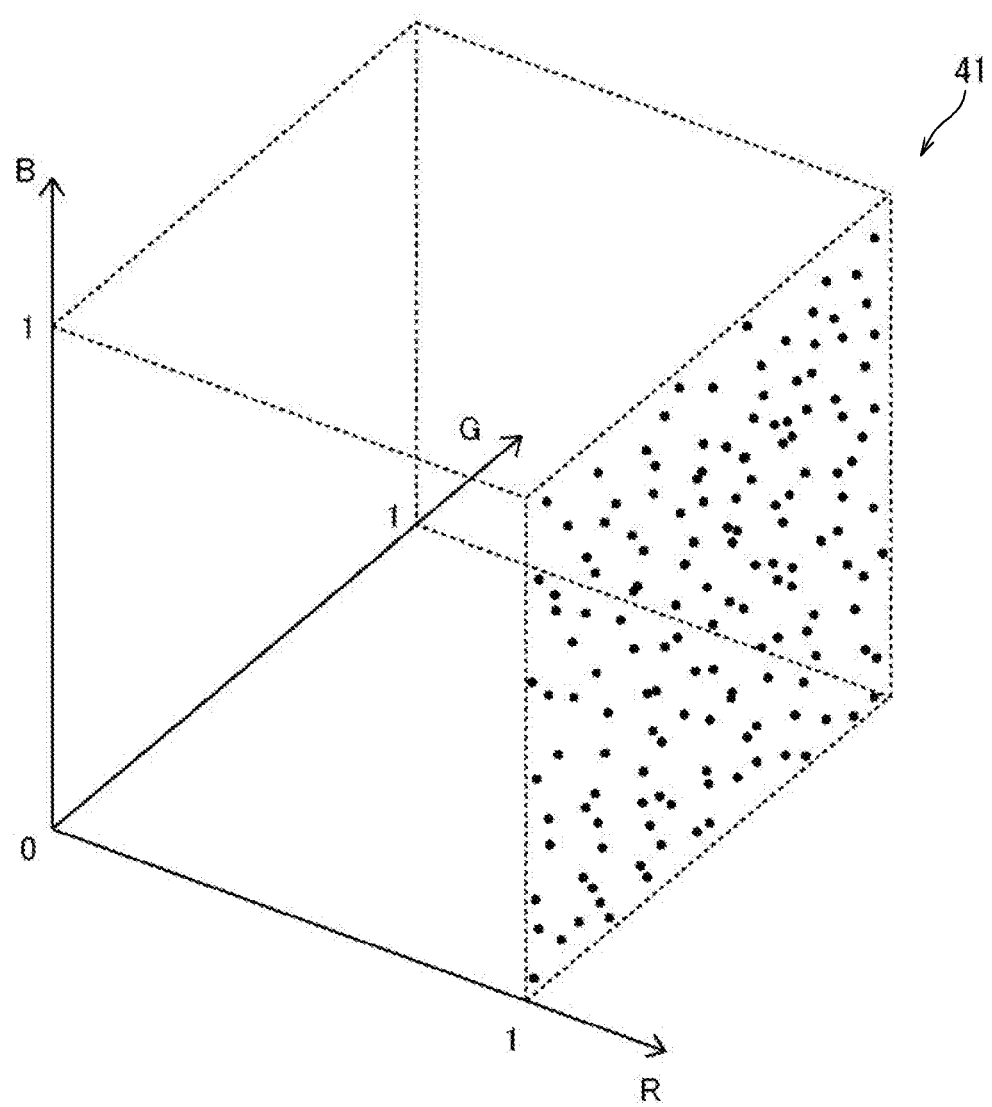
FIG. 6 is a diagram illustrating an example of a group of points each having an R value of "1", a randomized G value, and a randomized B value among points included in an outermost shell of a color gamut of the MFP illustrated in FIG. 2.

In a case where the minimum value of the input range is "0" and the maximum value of the input range is "1", for example, the color gamut boundary line segment acquiring section 35a sets the value of any one of the R channel, the G channel, and the B channel to "0" or "1". The color gamut boundary line segment acquiring section 35a then randomizes values as values of the other channels of the R channel, the G channel, and the B channel, and creates combinations using the randomized values. The above-described process generates a group of points that are included in the outermost shell of the color gamut. FIG. 6 is a diagram illustrating an example of a group of points 41 each having an R value of "1", a randomized G value, and a randomized B value among points included in the outermost shell of the color gamut. In other words, FIG. 6 illustrates points each having an R value of "1" among the points included in the outermost shell of the color gamut. Of the points included in the outermost shell of the color gamut, points each having an R value of "0", points each having a G value of "1", points each having a G value of "0", points each having a B value of "1", and points each having a B value of "0" are generated in the same manner as for the points each having an R value of "1".

Alternatively, in a case where the minimum value of the input range is "0" and the maximum value of the input range is "1", for example, the color gamut boundary line segment acquiring section 35a sets the value of any one of the R channel, the G channel, and the B channel to "0" or "1". The color gamut boundary line segment acquiring section 35a then calculates equally spaced values as values of the other channels of the R channel, the G channel, and the B channel, and creates combinations using the calculated values. The above-described process generates a group of points that are included in the outermost shell of the color gamut.

Figure 7:
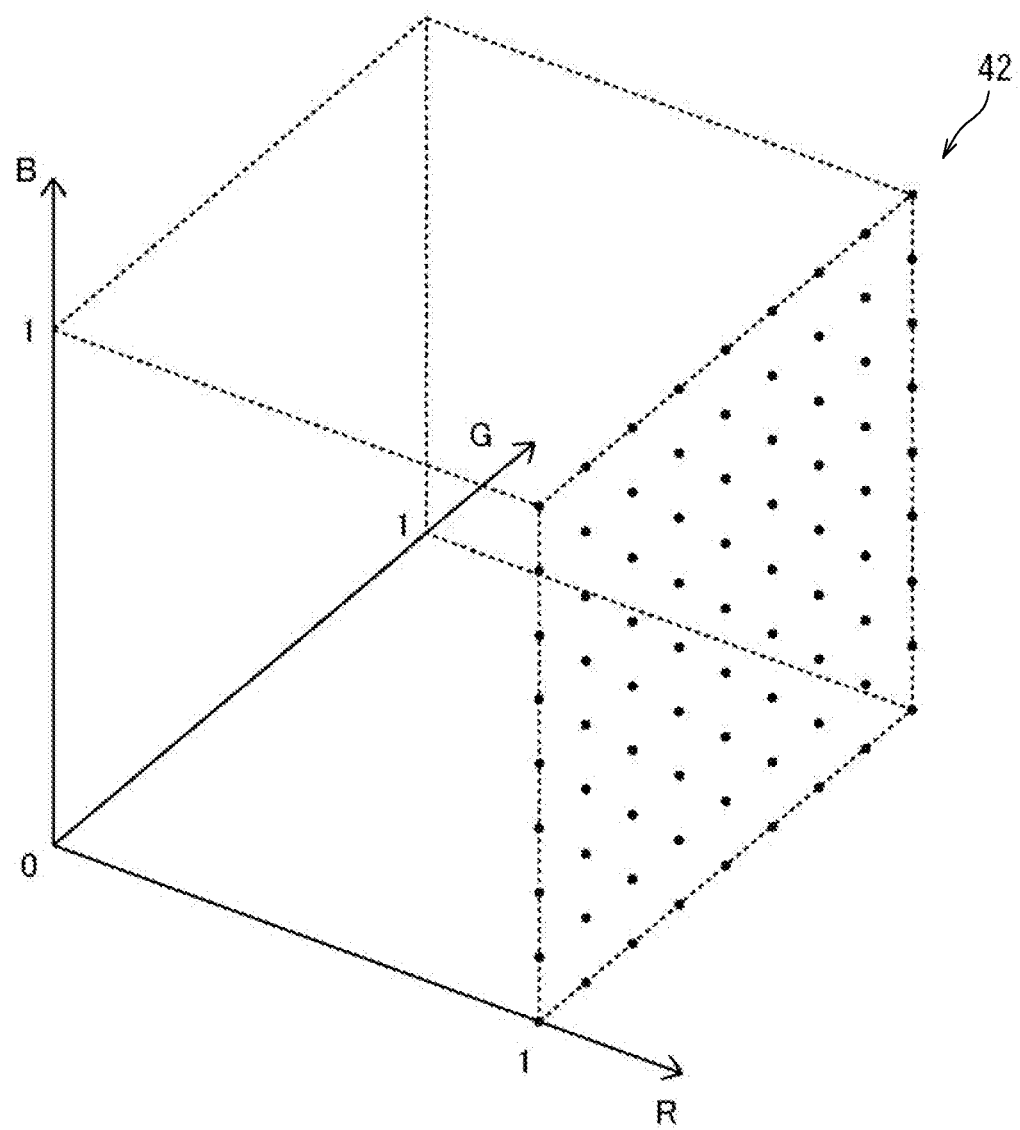
FIG. 7 is a diagram illustrating an example of a group of points each having an R value of "1", and G and B values each being any of values obtained by equally dividing an input range into eight among points included in the outermost shell of the color gamut of the MFP illustrated in FIG. 2.

FIG. 7 is a diagram illustrating an example of a group of points 42 each having an R value of "1", and G and B values each being any of values obtained by equally dividing the input range into eight among the points included in the outermost shell of the color gamut. More specifically, the G and B values of the group of points 42 illustrated in FIG. 7 are each any of "0", "1/8", "1/4", "3/8", "1/2", "5/8", "3/4", "7/8", and "1". In other words, FIG. 7 illustrates points each having an R value of "1" among the points included in the outermost shell of the color gamut. Of the points included in the outermost shell of the color gamut, points each having an R value of "0", points each having a G value of "1", points each having a G value of "0", points each having a B value of "1", and points each having a B value of "0" are generated in the same manner as for the points each having an R value of "1". Although the description has been made taking a case where the input range is equally divided into eight as an example, the input range may be divided into any number of equal parts.

Next, description is given of a case where the color gamut boundary line segment acquiring section 35a prepares data of a chart including patches of the colors of the outermost shell of the color gamut of the MFP 20 and patches of colors other than the colors of the outermost shell of the color gamut of the MFP 20 in Step S131.

The color gamut boundary line segment acquiring section 35a prepares data of an existing chart prepared in order to grasp the entire color gamut of the MFP 20 for data of a chart including patches of colors of the outermost shell of the color gamut of the MFP 20 and patches of colors other than the colors of the outermost shell of the color gamut of the MFP 20.

Alternatively, the color gamut boundary line segment acquiring section 35a generates data of a chart including patches of the colors of the outermost shell of the color gamut of the MFP 20 and patches of colors other than the colors of the outermost shell of the color gamut of the MFP 20.

For example, the color gamut boundary line segment acquiring section 35a randomizes values as values of the R channel, the G channel, and the B channel, and creates combinations using the randomized values. Thus, the data of the chart including patches of the colors of the outermost shell of the color gamut of the MFP 20 and patches of colors other than the colors of the outermost shell of the color gamut of the MFP 20 is generated. Alternatively, the color gamut boundary line segment acquiring section 35a calculates equally spaced values as values of the R channel, the G channel, and the B channel, and creates combinations using the calculated values. Thus, the data of the chart including patches of the colors of the outermost shell of the color gamut of the MFP 20 and patches of colors other than the colors of the outermost shell of the color gamut of the MFP 20 is generated.

Subsequent to Step S131, the color gamut boundary line segment acquiring section 35a causes the printer 24 to print the chart based on the data prepared in Step S131 (Step S132).

Next, the color gamut boundary line segment acquiring section 35a acquires Lab values of the patches of the colors included in the outermost shell of the color gamut of the MFP 20 (Step S133). The Lab values are an example of chromaticity values. For example, the colors of the chart printed in Step S132 are measured using a colorimeter to determine the Lab values. The thus determined Lab values are input using the operation device 31, so that the color gamut boundary line segment acquiring section 35a acquires the Lab values (chromaticity values) of the patches of the colors included in the outermost shell of the color gamut of the MFP 20.

Based on the data of the chart prepared in Step S131, the color gamut boundary line segment acquiring section 35a can determine correspondences between the chromaticity values of the patches and the color values of the patches. Accordingly, the color gamut boundary line segment acquiring section 35a can determine which colors of patches correspond to the colors included in the outermost shell of the color gamut of the MFP 20 based on the color values indicated by the data of the chart prepared in Step S131.

Subsequent to Step S133, the color gamut boundary line segment acquiring section 35a stores the correspondences between the color values and the chromaticity values on a color-by-color basis with respect to the colors of the outermost shell of the color gamut of the MFP 20 (Step S134). The correspondences between the color values and the chromaticity values are determined based on the color values indicated by the data of the chart prepared in Step S131 and the chromaticity values acquired in Step S133.

Figure 8:
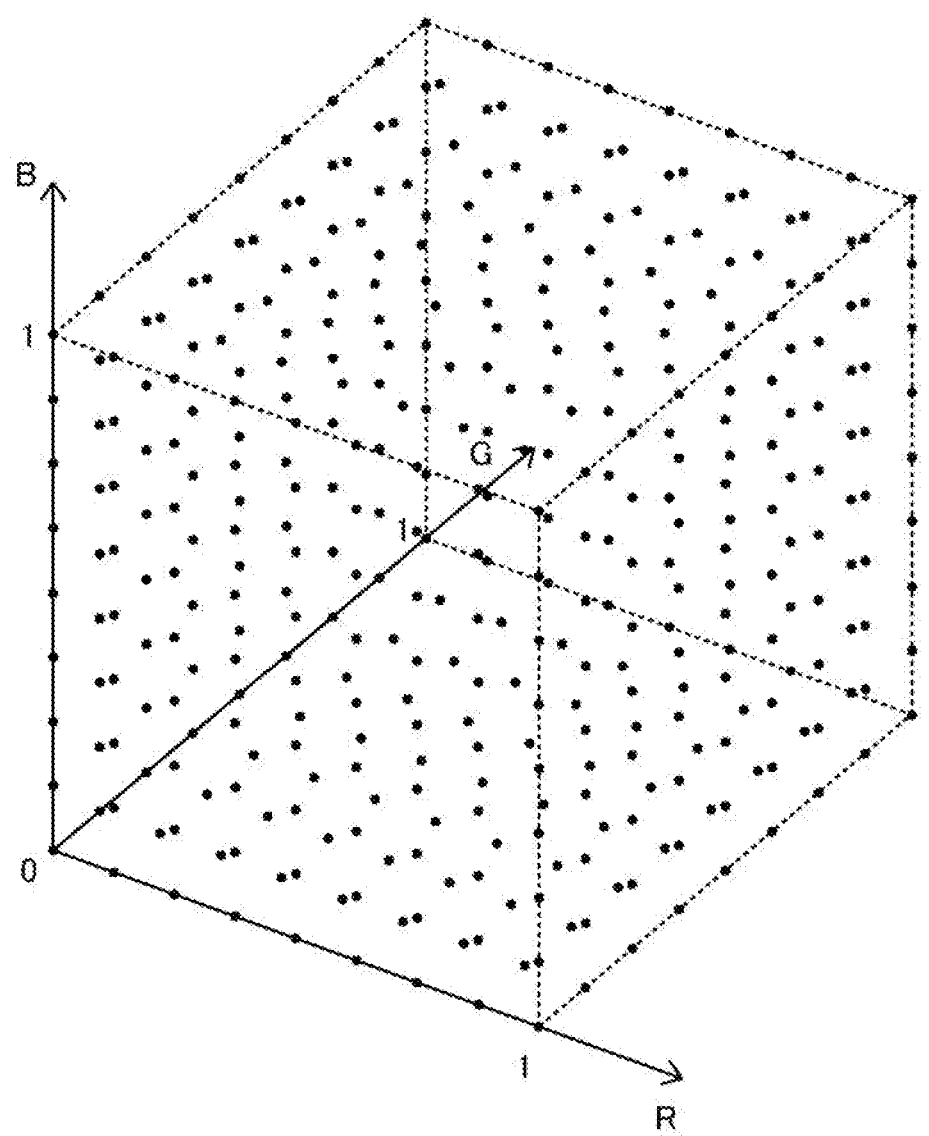
FIG. 8 is a diagram illustrating an example of points included in the outermost shell of the color gamut of the MFP illustrated in FIG. 2.
Figure 9:
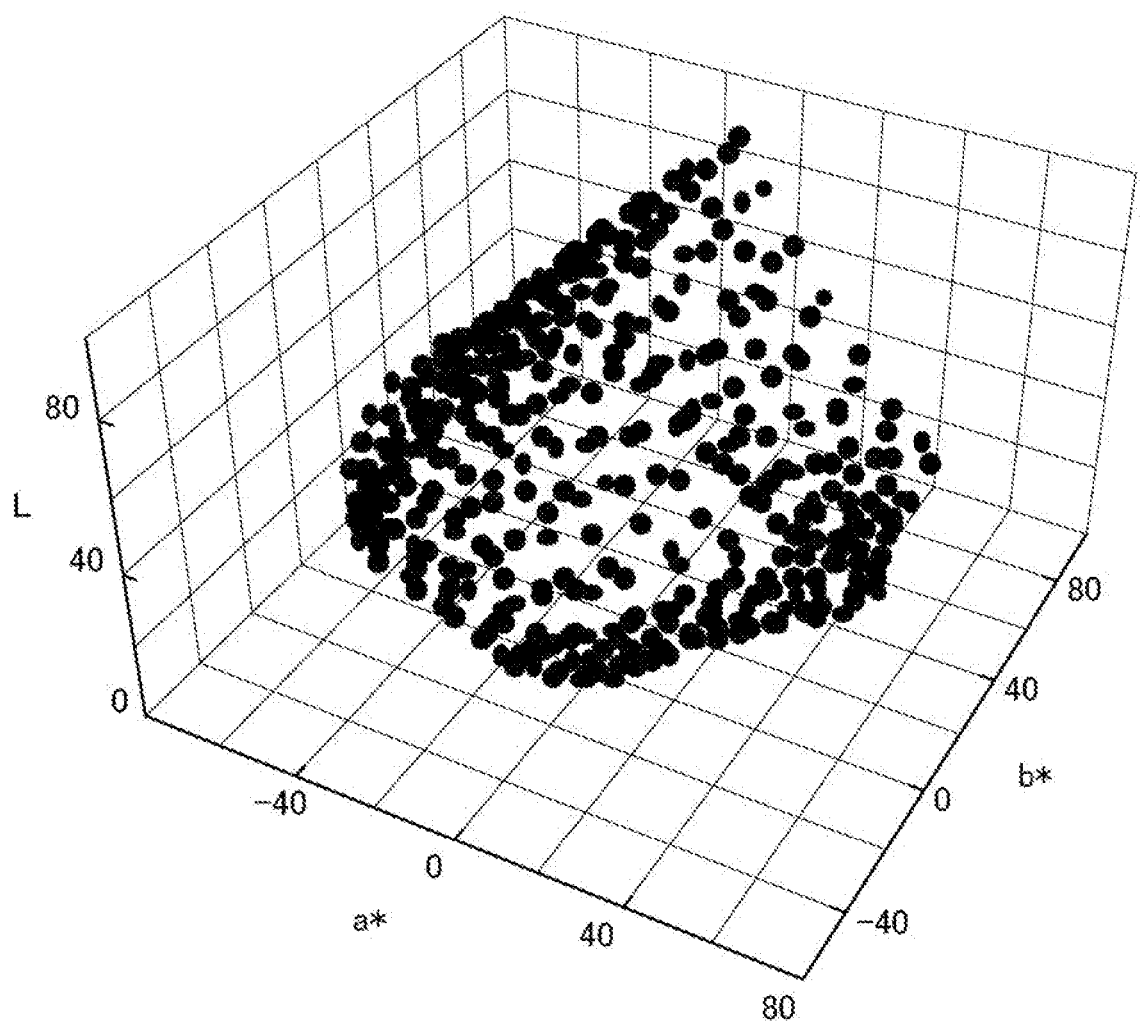
FIG. 9 is a diagram illustrating an example of points in a Lab color space that correspond to the points illustrated in FIG. 8.

In a case where a chart including patches of colors corresponding to color values illustrated in FIG. 8 is printed by the printer 24 in Step S132, for example, Lab values (chromaticity values) illustrated in FIG. 9 are acquired in Step S133. FIG. 8 is a diagram illustrating an example of color values of the colors included in the outermost shell of the color gamut of the MFP 20. FIG. 9 is a diagram illustrating an example of points (chromaticity values) in a Lab color space that correspond to the points (color values) illustrated in FIG. 8. The colors illustrated in FIG. 8 include colors each having an R value of "0" or "1", and G and B values each being any of "0", "1/8", "1/4", "3/8", "1/2", "5/8", "3/4", "7/8", and "1". The colors illustrated in FIG. 8 also include colors each having a G value of "0" or "1", and R and B values each being any of "0", "1/8", "1/4", "3/8", "1/2", "5/8", "3/4", "7/8", and "1". The colors illustrated in FIG. 8 further include colors each having a B value of "0" or "1", and R and G values each being any of "0", "1/8", "1/4", "3/8", "1/2", "5/8", "3/4", "7/8", and "1".

Subsequent to Step S134, the color gamut boundary line segment acquiring section 35a acquires line segments each including two adjacent color values of the color values stored in Step S134 as endpoints thereof (Step S135).

First, description is given of a case where the color values stored in Step S134 are equally spaced.

In a case where the color values stored in Step S134 are equally spaced, the color gamut boundary line segment acquiring section 35a for example acquires line segments based on an arrangement of the color values stored in Step S134. Alternatively, the color gamut boundary line segment acquiring section 35a acquires line segments by forming polygons based on points of the color values stored in Step S134.

First, description is given of a method by which line segments are acquired based on an arrangement of the color values stored in Step S134.

The following describes a case, as an example, where the color values stored in Step S134 are the color values illustrated in FIG. 8.

Color values each having an R value of "0" for example have G and B values each being any of "0", "1/8", "1/4", "3/8", "1/2", "5/8", "3/4", "7/8", and "1".

Figure 10:
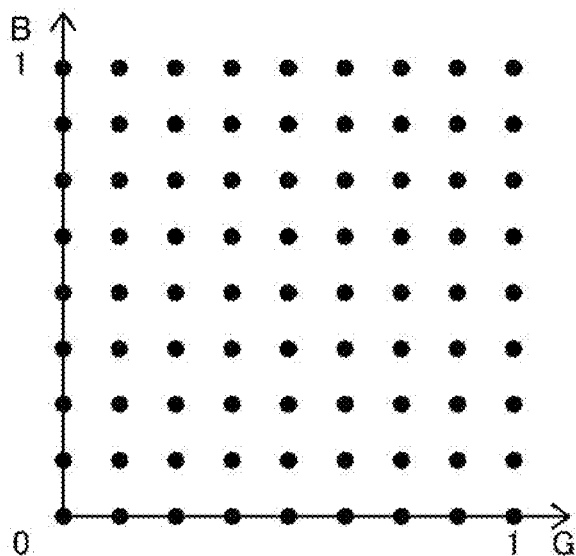
FIG. 10 is a diagram illustrating color values each having an R value of "0" among color values illustrated in FIG. 8.

FIG. 10 is a diagram illustrating color values each having an R value of "0" among the color values illustrated in FIG. 8.

Hereinafter, the G values and the B values of the color values illustrated in FIG. 10 will be represented by "rows" and "columns", respectively. More specifically, a color value having a G value of "0" is referred to as "a color value in the 1 row". Likewise, a color value having a G value of "1/8", "1/4", "3/8", "1/2", "5/8", "3/4", "7/8", or "1" is referred to as "a color value in the $2^{nd}$ row", "a color value in the $3^{rd}$ row", "a color value in the $4^{th}$ row", "a color value in the $5^{th}$ row", "a color value in the $6^{th}$ row", "a color value in the $7^{th}$ row", "a color value in the $8^{th}$ row", or "a color value in the $9^{th}$ row", respectively. Likewise, a color value having a B value of "0", "1/8", "1/4", "3/8", "1/2", "5/8", "3/4", "7/8", or "1" is referred to as "a color value in the $1^{st}$ column", "a color value in the $2^{nd}$ column", "a color value in the $3^{rd}$ column", "a color value in the $4^{th}$ column", "a color value in the $5^{th}$ column", "a color value in the $6^{th}$ column", "a color value in the $7^{th}$ column", "a color value in the $8^{th}$ column", or "a color value of the $9^{th}$ column", respectively. For example, a color value having a G value of "1/8" and a B value of "3/8" is referred to as "a color value in the $2^{nd}$ row and the $4^{th}$ column".

Figure 11:
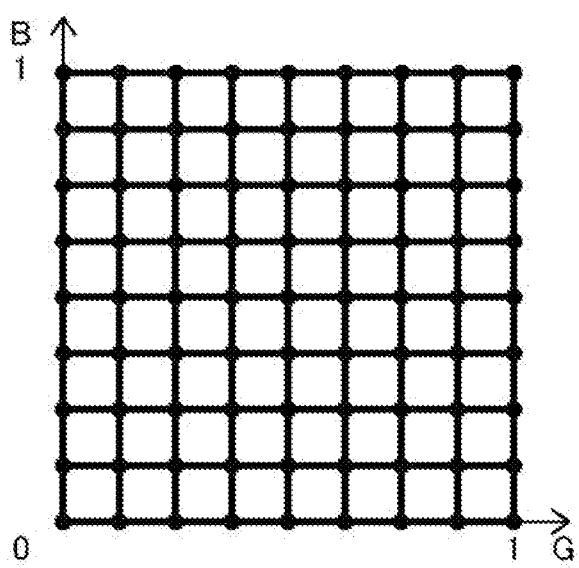
FIG. 11 is a diagram illustrating an example of patterns for acquiring line segments based on the color values illustrated in FIG. 10.

The color gamut boundary line segment acquiring section 35a acquires line segments represented by thick lines in FIG. 11 in Step S135. More specifically, the color gamut boundary line segment acquiring section 35a acquires "line segments each including a color value in the $i^{th}$ row and the $j^{th}$ column, and a color value in the $(i+1)^{th}$ row and the $j^{th}$ column as endpoints thereof" and "line segments each including a color value in the $i^{th}$ row and the $j^{th}$ column, and a color value in the $i^{th}$ row and the $(j+1)^{th}$ column as endpoints thereof". In the present embodiment, "i" and "j" are each 1, 2, 3, 4, 5, 6, 7, or 8.

Figure 12A:
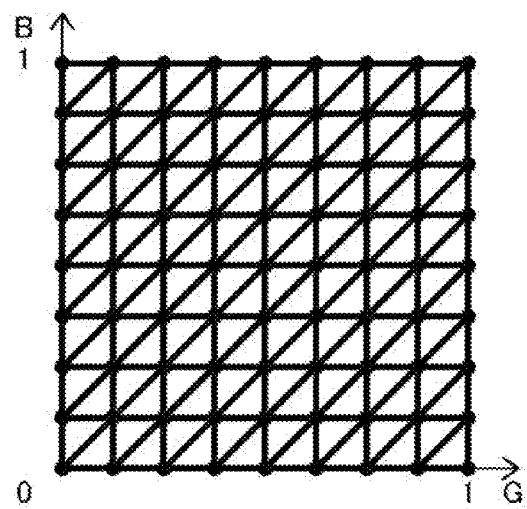
FIG. 12A is a diagram illustrating another example of patterns for acquiring line segments based on the color values illustrated in FIG. 10, which is a different example from the example illustrated in FIG. 11.

Alternatively, the color gamut boundary line segment acquiring section 35a acquires line segments represented by thick lines in FIG. 12A in Step S135. More specifically, the color gamut boundary line segment acquiring section 35a acquires "line segments each including a color value in the $i^{th}$ row and the $j^{th}$ column, and a color value in the $(i+1)^{th}$ row and the $j^{th}$ column as endpoints thereof", "line segments each including a color value in the $i^{th}$ row and the $j^{th}$ column, and a color value in the $i^{th}$ row and the $(j+1)^{th}$ column as endpoints thereof", and "line segments each including a color value in the $i^{th}$ row and the $j^{th}$ column, and a color value in the $(i+1)^{th}$ row and the $(j+1)^{th}$ column as endpoints thereof". In the present embodiment, "i" and "j" are each 1, 2, 3, 4, 5, 6, 7, or 8.

Figure 12B:
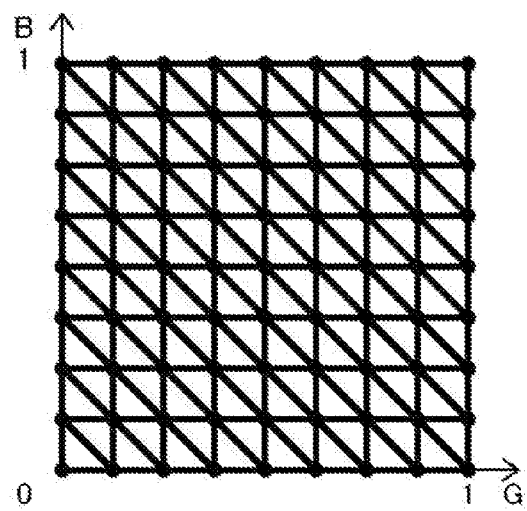
FIG. 12B is a diagram illustrating another example of patterns for acquiring line segments based on the color values illustrated in FIG. 10, which is a different example from the examples illustrated in FIGS. 11 and 12A.

Alternatively, the color gamut boundary line segment acquiring section 35a acquires line segments represented by thick lines in FIG. 12B in Step S135. More specifically, the color gamut boundary line segment acquiring section 35a acquires "line segments each including a color value in the $i^{th}$ row and the $j^{th}$ column, and a color value in the $(i+1)^{th}$ row and the $j^{th}$ column as endpoints thereof", "line segments each including a color value in the $i^{th}$ row and the $j^{th}$ column, and a color value in the $i^{th}$ row and the $(j+1)^{th}$ column as endpoints thereof", and "line segments each including a color value in the (i+1) row and the $j^{th}$ column, and a color value in the $i^{th}$ row and the $(j+1)^{th}$ column as endpoints thereof". In the present embodiment, "i" and "j" are each 1, 2, 3, 4, 5, 6, 7, or 8.

Figure 12C:
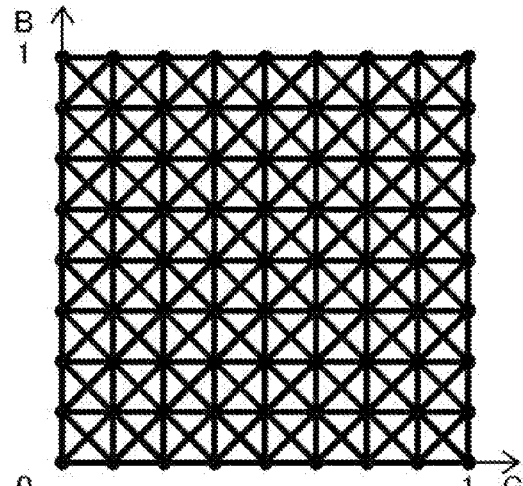
FIG. 12C is a diagram illustrating another example of patterns for acquiring line segments based on the color values illustrated in FIG. 10, which is a different example from the examples illustrated in FIGS. 11, 12A, and 12B.

Alternatively, the color gamut boundary line segment acquiring section 35a acquires line segments represented by thick lines in FIG. 12C in Step S135. More specifically, the color gamut boundary line segment acquiring section 35a acquires "line segments each including a color value in the $i^{th}$ row and the $j^{th}$ column, and a color value in the $(i+1)^{th}$ row and the $j^{th}$ column as endpoints thereof", "line segments each including a color value in the $i^{th}$ row and the $j^{th}$ column, and a color value in the $i^{th}$ row and the $(j+1)^{th}$ column as endpoints thereof", "line segments each including a color value in the $i^{th}$ row and the $j^{th}$ column, and a color value in the $(i+1)^{th}$ row and the $(j+1)^{th}$ column as endpoints thereof", and "line segments each including a color value in the $(i+1)^{th}$ row and the $j^{th}$ column, and a color value in the $i^{th}$ row and the $(j+1)^{th}$ column as endpoints thereof". In the present embodiment, "i" and "j" are each 1, 2, 3, 4, 5, 6, 7, or 8.

In a case where line segments are acquired according to a pattern illustrated in FIG. 11, no diagonal line segments are acquired with respect to all the "rectangular regions each including a color value in the $i^{th}$ row and the $j^{th}$ column, a color value in the $(i+1)^{th}$ row and the $j^{th}$ column, a color value in the $i^{th}$ row and the $(j+1)^{th}$ column, and a color value in the $(i+1)^{th}$ row and the $(j+1)^{th}$ column". On the other hand, in a case where line segments are acquired according to a pattern illustrated in FIG. 12A, line segments sloping upward to the right are acquired as diagonal line segments with respect to all the rectangular regions. In a case where line segments are acquired according to a pattern illustrated in FIG. 12B, line segments sloping downward to the right are acquired as diagonal line segments with respect to all the rectangular regions. In a case where line segments are acquired according to a pattern illustrated in FIG. 12C, both line segments sloping upward to the right and line segments sloping downward to the right are acquired as diagonal line segments with respect to all the rectangular regions. However, the color gamut boundary line segment acquiring section 35a may acquire line segments according to at least two of the pattern illustrated in FIG. 11 including no diagonal line segments, the pattern illustrated in FIG. 12A including only line segments sloping upward to the right as the diagonal line segments, the pattern illustrated in FIG. 12B including only line segments sloping downward to the right as the diagonal line segments, and the pattern illustrated in FIG. 12C including both line segments sloping upward to the right and line segments sloping downward to the right as the diagonal line segments. For example, the color gamut boundary line segment acquiring section 35a may employ a different pattern from among the patterns illustrated in FIGS. 11, 12A, 12B, and 12C for each of the "rectangular regions each including a color value in the $i^{th}$ row and the $j^{th}$ column, a color value in the $(i+1)$ row and the $j^{th}$ column, a color value in the $i^{th}$ row and the $(j+1)^{th}$ column, and a color value in the $(i+1)^{th}$ row and the $(j+1)^{th}$ column". In the present embodiment, "i" and "j" are each 1, 2, 3, 4, 5, 6, 7, or 8.

The foregoing description of the method for acquiring line segments based on an arrangement of color values has been given taking points each having an R value of "0" as an example. The color gamut boundary line segment acquiring section 35a acquires line segments based on points each having an R value of "1", points each having a G value of "0", points each having a G value of "1", points each having a B value of "0", and points each having a B value of "1" in the same manner as in the acquisition of line segments based on points each having an R value of "0".

Next, description is given of a method by which the color gamut boundary line segment acquiring section 35a acquires line segments by forming polygons based on points of the color values stored in Step S134.

The color gamut boundary line segment acquiring section 35a for example converts a set of points having an R value of "0", among the points of the color values stored in Step S134, to a set of triangles. That is, the color gamut boundary line segment acquiring section 35a performs a Delaunay triangulation. As a result, polygons (Delaunay triangles) each formed of neighboring three points are obtained. The color gamut boundary line segment acquiring section 35a acquires line segments by extracting line segments forming the polygons. Note that the polygons share the boundary line segments with their adjacent polygons. It is therefore preferable that the color gamut boundary line segment acquiring section 35a acquires line segments by excluding redundant line segments of the line segments shared by adjacent polygons from the line segments forming the polygons.

The foregoing description of the method for acquiring line segments by forming polygons has been given taking a set of points each having an R value of "O" as an example. The color gamut boundary line segment acquiring section 35a acquires line segments based on a set of points each having an R value of "1", a set of points each having a G value of "0", a set of points each having a G value of "1", a set of points each having a B value of "0", and a set of points each having a B value of "1" in the same manner as in the acquisition of line segments based on a set of points each having an R value of "0".

Next, description is given of a case where the color values stored in Step S134 are randomly arranged.

In a case where the points of the color values stored in Step S134 do not include, for example, any of a point having an R value of "0", a G value of "0", and a B value of "0"; a point having an R value of "0", a G value of "0", and a B value of "1"; a point having an R value of "0", a G value of "1", and a B value of "0"; and a point having an R value of "0", a G value of "1", and a B value of "1", the color gamut boundary line segment acquiring section 35a adds such a lacking point. Furthermore, the color gamut boundary line segment acquiring section 35a may add some points each having a G value of "0", some points each having a G value of "1", some points each having a B value of "0", and some points each having a B value of "1". Adding such points makes the color gamut boundary, which is defined by the line segments acquired in Step S135, convex. After adding points, the color gamut boundary line segment acquiring section 35a converts a set of points each having an R value of "0" to a set of triangles. That is, the color gamut boundary line segment acquiring section 35a performs a Delaunay triangulation. As a result, polygons (Delaunay triangles) each formed of neighboring three points are obtained. The color gamut boundary line segment acquiring section 35a then acquires line segments by extracting line segments forming the polygons. Note that the polygons share the boundary line segments with their adjacent polygons. It is therefore preferable that the color gamut boundary line segment acquiring section 35a acquires line segments by excluding redundant line segments of the line segments shared by adjacent polygons from the line segments forming the polygons.

The foregoing description of the method for acquiring line segments from the randomly arranged color values has been given taking a set of points each having an R value of "0" as an example. The color gamut boundary line segment acquiring section 35a acquires line segments based on a set of points each having an R value of "1", a set of points each having a G value of "0", a set of points each having a G value of "1", a set of points each having a B value of "0", and a set of points each having a B value of "1" in the same manner as in the acquisition of line segments based on a set of points each having an R value of "0".

Figure 13:
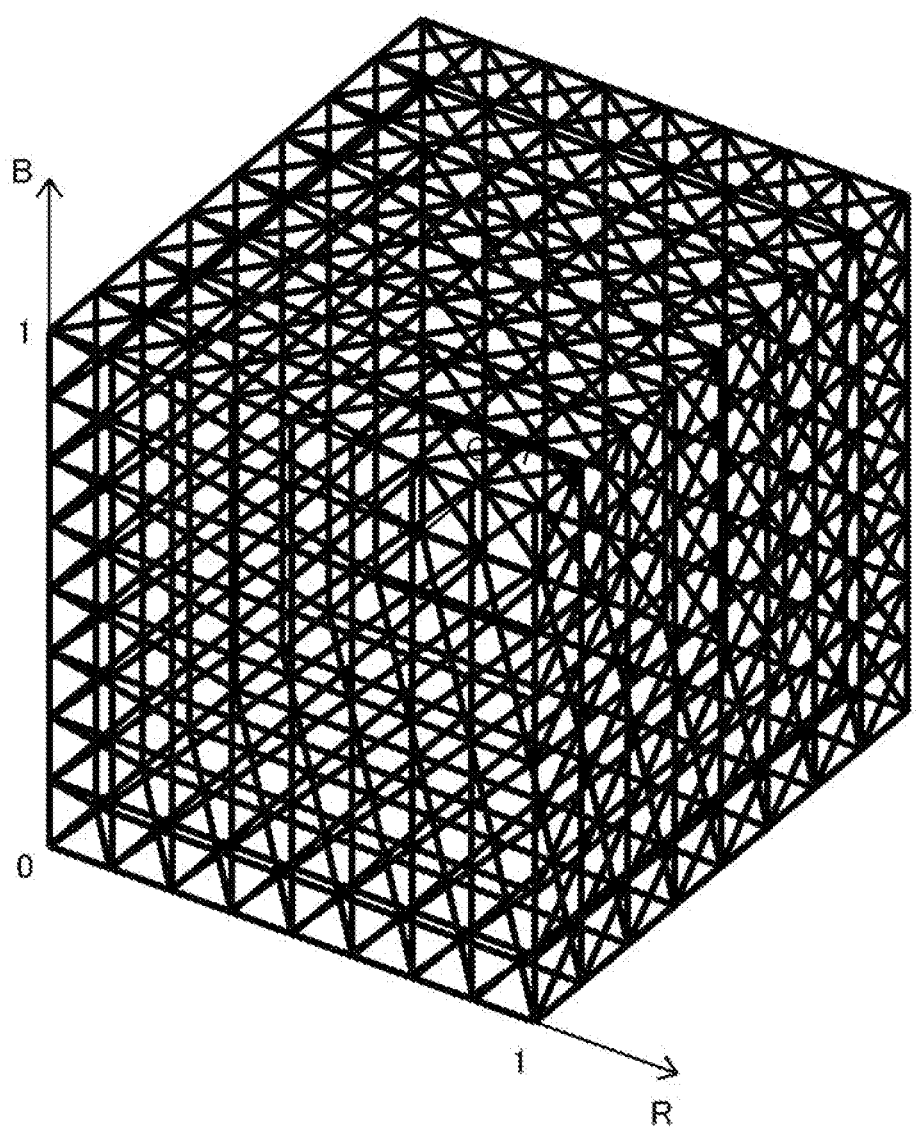
FIG. 13 is a diagram illustrating line segments acquired by employing the pattern illustrated in FIG. 12A for the points illustrated in FIG. 8.

In a case where a chart including patches corresponding to the color values illustrated in FIG. 8 is printed by the printer 24 in Step S132, for example, the color gamut boundary line segment acquiring section 35a employs the pattern illustrated in FIG. 12A for all the color values each having an R value of "0", the color values each having an R value of "1", the color values each having a G value of "0", the color values each having a G value of "1", the color values each having a B value of "0", and the color values each having a B value of "1" to acquire line segments illustrated in FIG. 13 in Step S135.

Subsequent to Step S135, the color gamut boundary line segment acquiring section 35a acquires line segments in a Lab color space corresponding to the line segments in the RGB color space acquired in Step S135 (Step S136). More specifically, the color gamut boundary line segment acquiring section 35a converts the endpoints of the line segments in the RGB color space acquired in Step S135 to points in the Lab color space based on the correspondences stored in Step S134. As a result of the conversion, the endpoints of the line segments in the Lab color space corresponding to the line segments in the RGB color space are acquired. The color gamut boundary line segment acquiring section 35a acquires an equation for each line segment in the Lab color space based on Lab values of the acquired points in the Lab color space in accordance with equation (1) shown below. In the equation (1), $\{L_i, a_i, b_i\}$ represents a point included in a line segment. $\{L_s, a_s, b_s\}$ represents a starting point, which is one of the two endpoints of the line segment. $\{L_e, a_e, b_e\}$ represents an ending point, which is the other of the two endpoints of the line segment. t is a parameter of at least 0 and no greater than 1.

$$\begin{pmatrix} L_i \\ a_i \\ b_i \end{pmatrix} = t \times \begin{pmatrix} L_e - L_s \\ a_e - a_s \\ b_e - b_s \end{pmatrix} + \begin{pmatrix} L_s \\ a_s \\ b_s \end{pmatrix} \quad (1)$$

Figure 14:
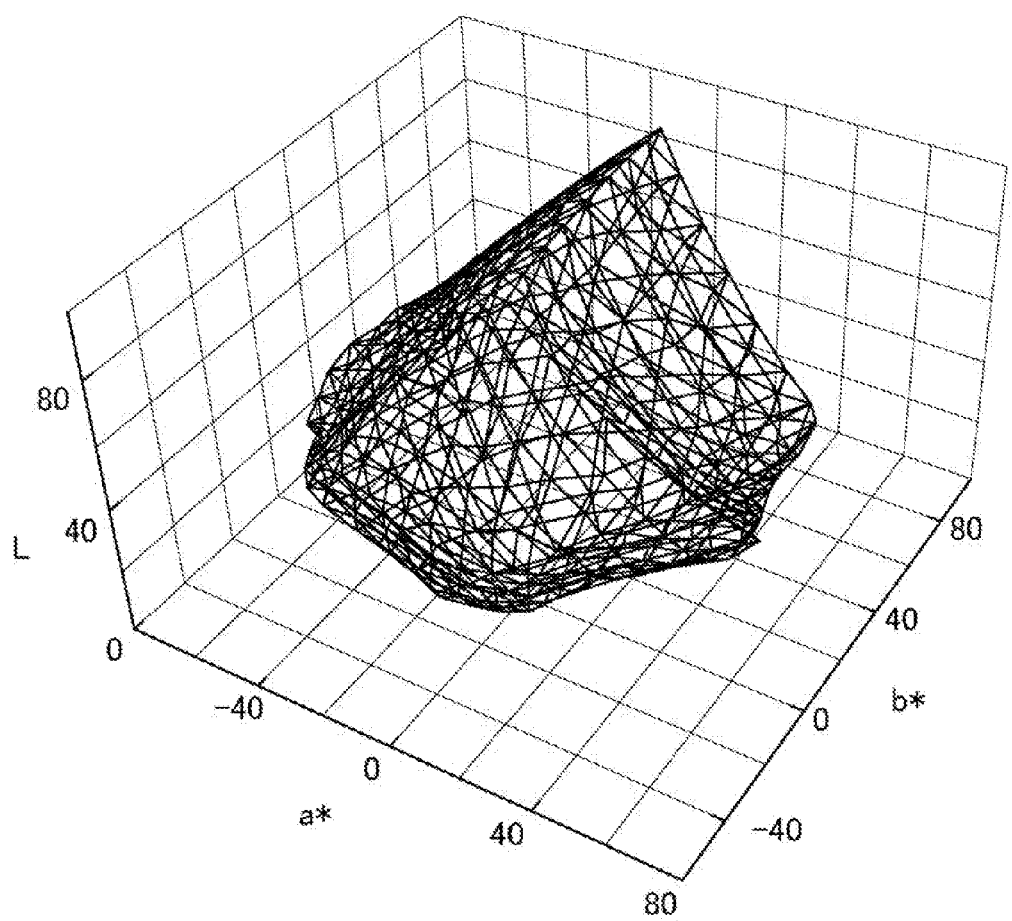
FIG. 14 is a diagram illustrating an example of line segments in a Lab color space that correspond to the line segments illustrated in FIG. 13.

The color gamut boundary line segment acquiring section 35a that has for example acquired the line segments illustrated in FIG. 13 in Step S135 acquires line segments in the Lab color space illustrated in FIG. 14 in Step S136.

As a method for acquiring line segments in Step S135, a method for acquiring line segments according to a pattern including no line segments intersecting with one another at positions therein other than endpoints thereof as illustrated in FIG. 11, 12A or 12B is preferable compared to a method for acquiring line segments according to a pattern including line segments intersecting with one another at positions therein other than endpoints thereof as illustrated in FIG. 12C.

Figure 15A:
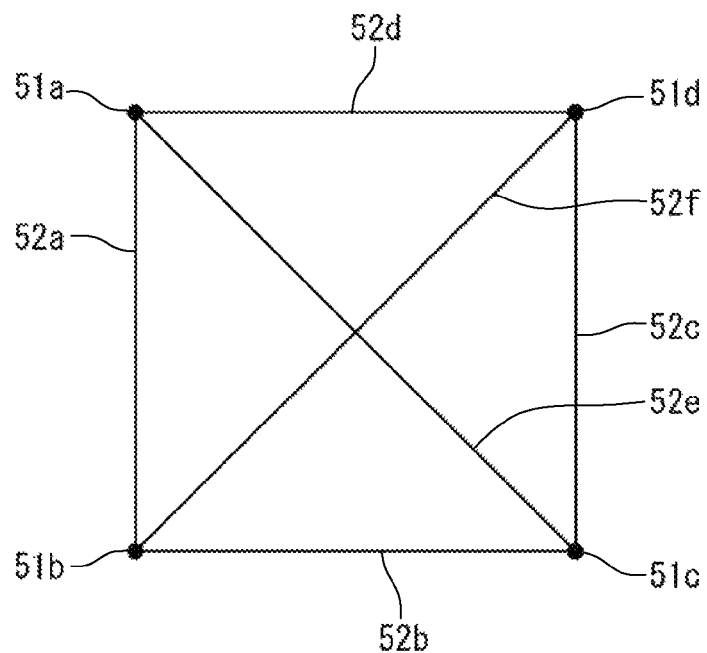
FIG. 15A is a diagram illustrating an example of line segments in an RGB color space that are acquired as a result of the color gamut boundary line segment acquiring process illustrated in FIG. 5.

For example, suppose line segments 52a, 52b, 52c, 52d, 52e, and 52f are acquired in Step S135 based on points 51a, 51b, 51c, and 51d included in a single plane in an RGB color space as illustrated in FIG. 15A. It is noted here that the line segment 52e intersects with the line segment 52f at a position other than endpoints thereof. The points 51a, 51b, 51c, and 51d in the RGB color space illustrated in FIG. 15A for example correspond to points 53a, 53b, 53c, and 53d in a Lab color space illustrated in FIG. 15B, respectively. The points 53a, 53b, 53c, and 53d are vertices of a tetrahedron. The line segments 52a, 52b, 52c, 52d, 52e, and 52f in the RGB color space illustrated in FIG. 15A for example correspond to line segments 54a, 54b, 54c, 54d, 54e, and 54f in the Lab color space illustrated in FIG. 15B, respectively. The line segments 54a, 54b, 54c, 54d, 54e, and 54f are edges of the tetrahedron.

Figure 15B:
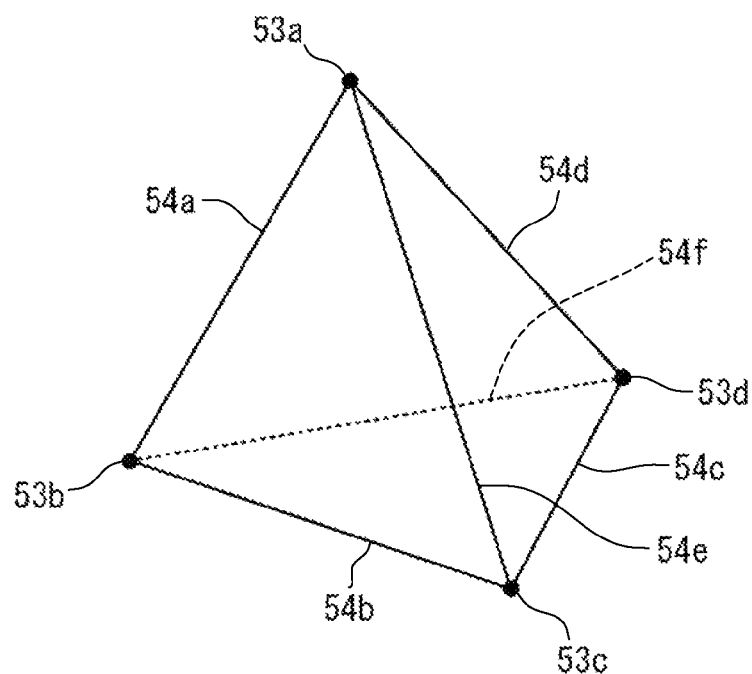
FIG. 15B is a diagram illustrating an example of line segments in a Lab color space that correspond to the line segments illustrated in FIG. 15A.

In FIG. 15B, the line segments 54a, 54b, 54c, 54d are color gamut boundary line segments (line segments for defining the outermost shell of the color gamut of the MFP 20). However, the outermost shell of the color gamut of the MFP 20 are formed by the points 53a, 53b, 53c and 53d, and therefore only one of the line segment 54e and the line segment 54f serves as a color gamut boundary line segment. For example, in a case where a triangle formed by the points 53a, 53b, and 53c, and a triangle formed by the points 53a, 53c, and 53d form the outermost shell of the color gamut of the MFP 20, the line segment 54e serves as a color gamut boundary line segment. Likewise, in a case where a triangle formed by the points 53a, 53b, and 53d, and a triangle formed by the points 53b, 53c, and 53d form the outermost shell of the color gamut of the MFP 20, the line segment 54f serves as a color gamut boundary line segment.

As described above, the method for acquiring line segments according to a pattern including line segments intersecting with one another at positions therein other than endpoints thereof as illustrated in FIG. 12C involves acquisition of line segments that do not serve as color gamut boundary line segments.

On the other hand, the method for acquiring line segments according to a pattern including no line segments intersecting with one another at positions therein other than endpoints thereof as illustrated in FIGS. 11, 12A, and 12B does not involve acquisition of line segments that do not serve as color gamut boundary line segments.

Therefore, as a method for acquiring line segments in Step S135, a method for acquiring line segments according to a pattern including no line segments intersecting with one another at positions therein other than endpoints thereof as illustrated in FIG. 11, 12A or 12B is preferable compared to a method for acquiring line segments according to a pattern including line segments intersecting with one another at positions therein other than endpoints thereof as illustrated in FIG. 12C.

However, in a case where a positional difference of the line segment 54e and the line segment 54f illustrated in FIG. 15B is sufficiently small relative to the size of the entire outermost shell of the color gamut of the MFP 20, acquisition of both the line segment 54e and the line segment 54f as color gamut boundary line segments has little effect on a cross-section boundary to be finally obtained. The color gamut boundary line segment acquiring section 35a may therefore acquire line segments according to a pattern including line segments intersecting with one another at positions therein other than endpoints thereof as illustrated in FIG. 12C.

Subsequent to completion of Step S136, as illustrated in FIG. 5, the color gamut boundary line segment acquiring section 35a ends the color gamut boundary line segment acquiring process illustrated in FIG. 5.

Subsequent to completion of the color gamut boundary line segment acquiring process (Step S101), the endpoint acquiring section 35c performs an endpoint acquiring process of acquiring endpoints of cross-section boundary line segments (Step S102) as illustrated in FIG. 4.

Figure 16:
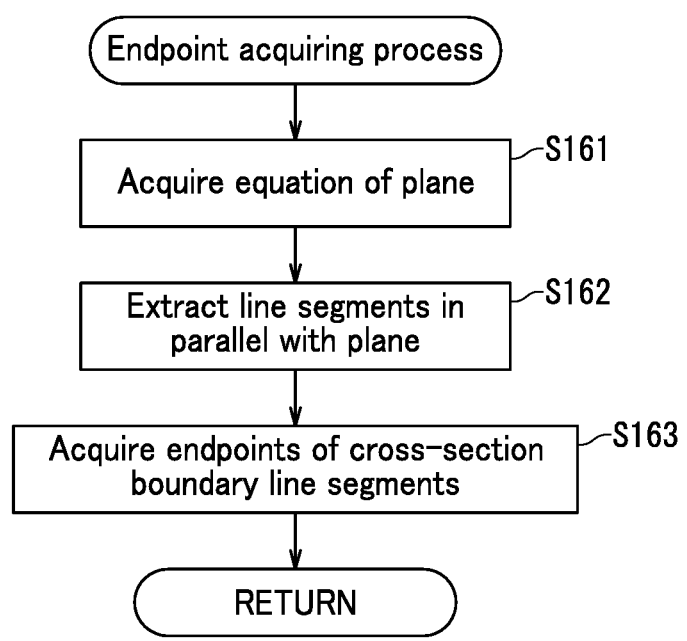
FIG. 16 is a flowchart of an endpoint acquiring process illustrated in FIG. 4.

FIG. 16 is a flowchart of the endpoint acquiring process in FIG. 4.

As illustrated in FIG. 16, the endpoint acquiring section 35c acquires an equation of a specific plane for acquiring a cross-section of the color gamut of the MFP (Step S161).

For example, in a case where a user has already specified a plane of constant lightness containing a specified point X $\{L_x, a_x, b_x\}$ or in a case where it has been already determined to acquire cross-section boundary line segments of a cross-section of the color gamut of the MFP 20 taken on a plane of lightness Lx, the endpoint acquiring section 35c acquires equation (2) shown below in Step S161.

$$L = L_x \quad (2)$$

In a case where a user has already specified a plane of constant hue containing a specified point X $\{L_x, a_x, b_x\}$, the plane contains an L axis. The plane can therefore be defined by equation (3) shown below based on three points: a black point K ($\{0, 0, 0\}$ present on the L axis, a white point W $\{100, 0, 0\}$ present on the L axis, and the specified point X $\{L_x, a_x, b_x\}$. The equation (3) is represented by equation (4) shown below. Thus, the endpoint acquiring section 35c acquires the equation (4) in Step S161.

$$(\overrightarrow{XW} \times \overrightarrow{XK}) \cdot \{L, a, b\} = 0 \quad (3)$$

$$ba_x = ab_x \quad (4)$$

In a case where a user has already specified a plane of specified hue angle $H_d$ or in a case where it has been already determined to acquire cross-section boundary line segments of a cross-section of the color gamut of the MFP 20 taken on a plane of the hue angle $H_d$, the endpoint acquiring section 35c acquires equation (5) shown below in Step S161.

$$b \cos [H_d] = a \sin [H_d] \quad (5)$$

In a case where a user has already specified a plane containing a specified point X $\{L_x, a_x, b_x\}$ and having a normal vector $\{p, q, r\}$, the endpoint acquiring section 35c acquires equation (6) shown below in Step S161.

$$p \times (L - L_x) + q \times (a - a_x) + r \times (b - b_x) = 0 \quad (6)$$

In a case where the specified point is defined by an RGB value, which is an example of a color value, the endpoint acquiring section 35c may convert the RGB value to a Lab value by referring to a conversion lookup table (LUT) for conversion between RGB values and Lab values. Alternatively, the endpoint acquiring section 35c may use a Lab value acquired as a result of color measurement. More specifically, the endpoint acquiring section 35c forms a patch (patch image) having the specified RGB value (color value of the specified point) and causes the printer 24 to print the patch. A color of the patch printed is measured using a colorimeter to determine a Lab value. The Lab value measured as described above is input via the operation device 31.

Subsequent to Step S161, the endpoint acquiring section 35c extracts line segments in parallel with the plane acquired in Step S161 from among the line segments acquired in Step S136 (Step S162). The line segments in parallel with the plane are extracted in order to reduce occurrence of failure, such as processing being stopped due to division by zero or endless calculation, in Step S163 to be described later. Note that a line segment that is actually in parallel with the plane acquired in Step S161 may be determined to be not in parallel with the plane due to a computing error during calculation by a computer. Therefore, in Step S162, the endpoint acquiring section 35c also extracts line segments substantially in parallel with the plane acquired in Step S161 as line segments in parallel with the plane.

Subsequent to Step S162, the endpoint acquiring section 35c acquires points of intersection between the line segments acquired in Step S136 and the plane acquired in Step S161 to use the intersection points as endpoints of cross-section boundary line segments (Step S163). The endpoint acquiring section 35c excludes the line segments extracted in Step S162 from the target of the process in Step S163.

The following describes a case where the plane acquired in Step S161 is defined by the equation (4).

The endpoint acquiring section 35c determines the value of $\{L_i, a_i, b_i\}$ and the value of the parameter t by simultaneously solving equation (7) shown below, which is based on the equation (4), and the equation (1). The equation (1) defines each of the line segments acquired in Step S136. In a case where the parameter t is less than "0" or greater than "1", $\{L_i, a_i, b_i\}$ is an intersection point between a straight line including the line segment acquired in Step S136 and the plane acquired in Step S161 but is not an intersection point between the line segment acquired in Step S136 and the plane acquired in Step S161. Therefore, the endpoint acquiring section 35c acquires $\{L_i, a_i, b_i\}$ with a parameter t of at least 0 and no greater than 1 as coordinates of the intersection point between the line segment acquired in Step S136 and the plane acquired in Step S161.

$$b_i a_x = a_i b_x \quad (7)$$

The foregoing description of the process of acquiring endpoints of cross-section boundary line segments has been given taking, as an example, a case where the plane acquired in Step S161 is defined by the equation (4). Note that if the plane acquired in Step S161 is defined by an equation other than the equation (4), endpoints of cross-section boundary line segments can be acquired in the same manner as in the case where the plane is defined by the equation (4).

Figure 17A:
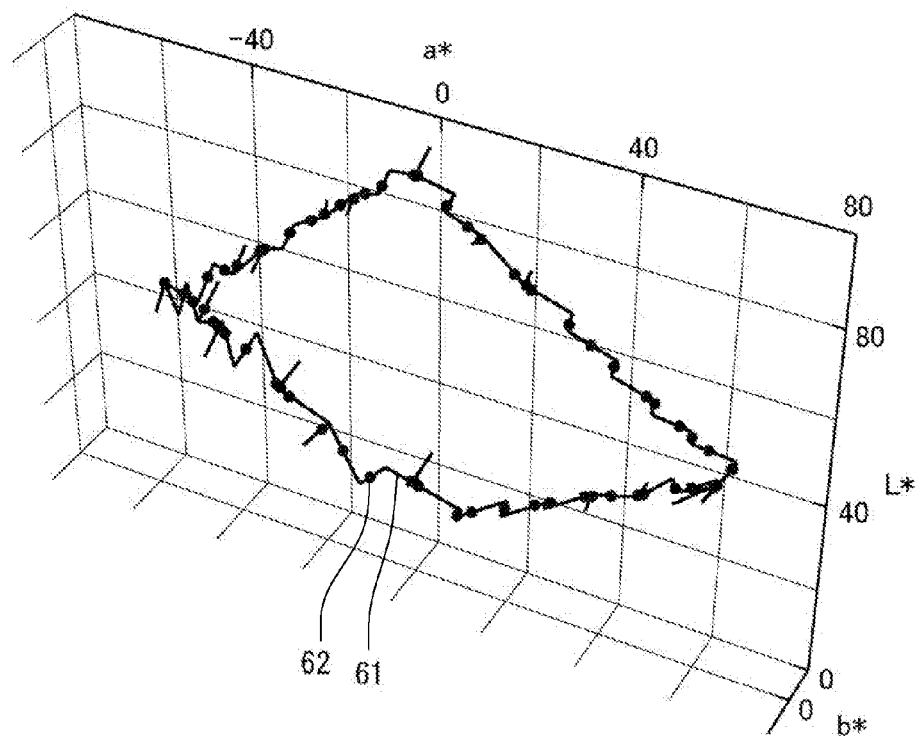
FIG. 17A is a diagram illustrating an example of color gamut boundary line segments and intersection points between a plane acquired as a result of the endpoint acquiring process illustrated in FIG. 16 and the color gamut boundary line segments.
Figure 17B:
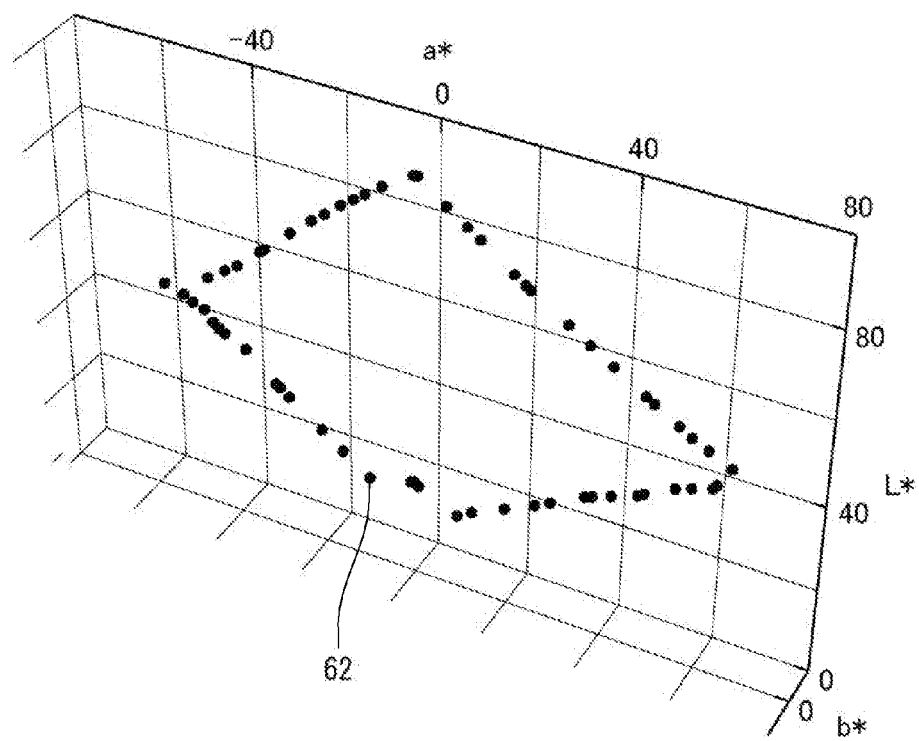
FIG. 17B is a diagram illustrating an example of the intersection points between the plane acquired as a result of the endpoint acquiring process illustrated in FIG. 16 and the color gamut boundary line segments.

FIG. 17A is a diagram illustrating an example of color gamut boundary line segments 61 and intersection points 62 between the plane acquired in Step S161 and the color gamut boundary line segments 61. More specifically, FIG. 17A illustrates an example of the intersection points 62 between a plane satisfying b=0 and the color gamut boundary line segments 61. FIG. 17B is a diagram illustrating an example of the intersection points 62 between the plane acquired in Step S161 and the color gamut boundary line segments 61. More specifically, FIG. 17B illustrates an example of the intersection points 62 between the plane satisfying b=0 and the color gamut boundary line segments 61. In other words, the intersection points 62 in FIG. 17B correspond to the intersection points 62 in FIG. 17A.

In a case where the plane acquired in Step S161 is a plane satisfying b=0, the endpoint acquiring section 35*c* acquires the intersection points 62 as illustrated in FIGS. 17A and 17B as endpoints of cross-section boundary line segments in Step S163.

Subsequent to completion of Step S163, as illustrated in FIG. 16, the endpoint acquiring section 35*c* ends the endpoint acquiring process illustrated in FIG. 16.

Subsequent to completion of the endpoint acquiring process in Step S102, as illustrated in FIG. 4, the cross-section boundary line segment acquiring section 35*b* performs a cross-section boundary line segment acquiring process of acquiring cross-section boundary line segments (Step S103).

Figure 18:
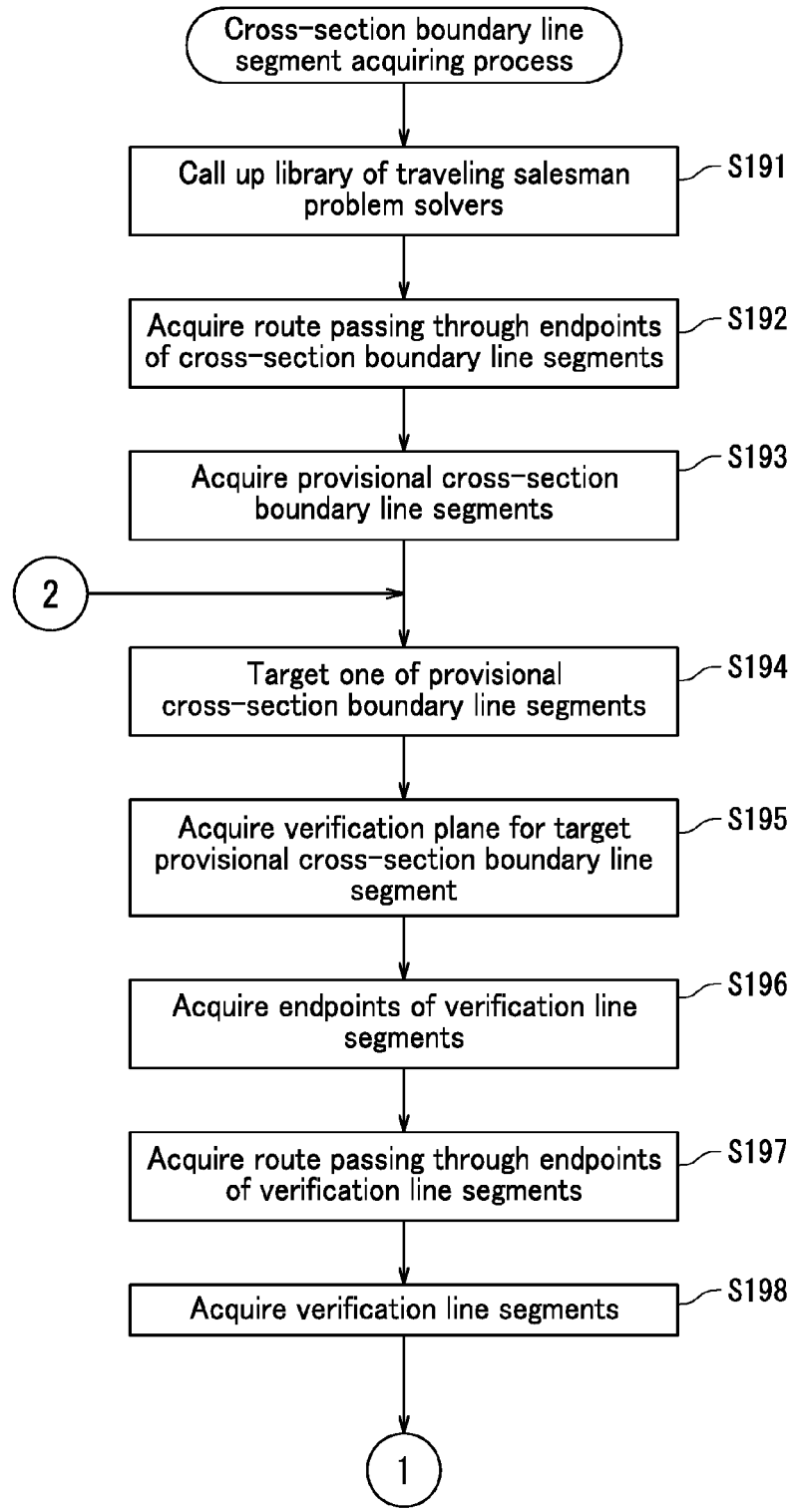
FIGS. 18 and 19 are a flowchart of a cross-section boundary line segment acquiring process illustrated in FIG. 4.
Figure 19:
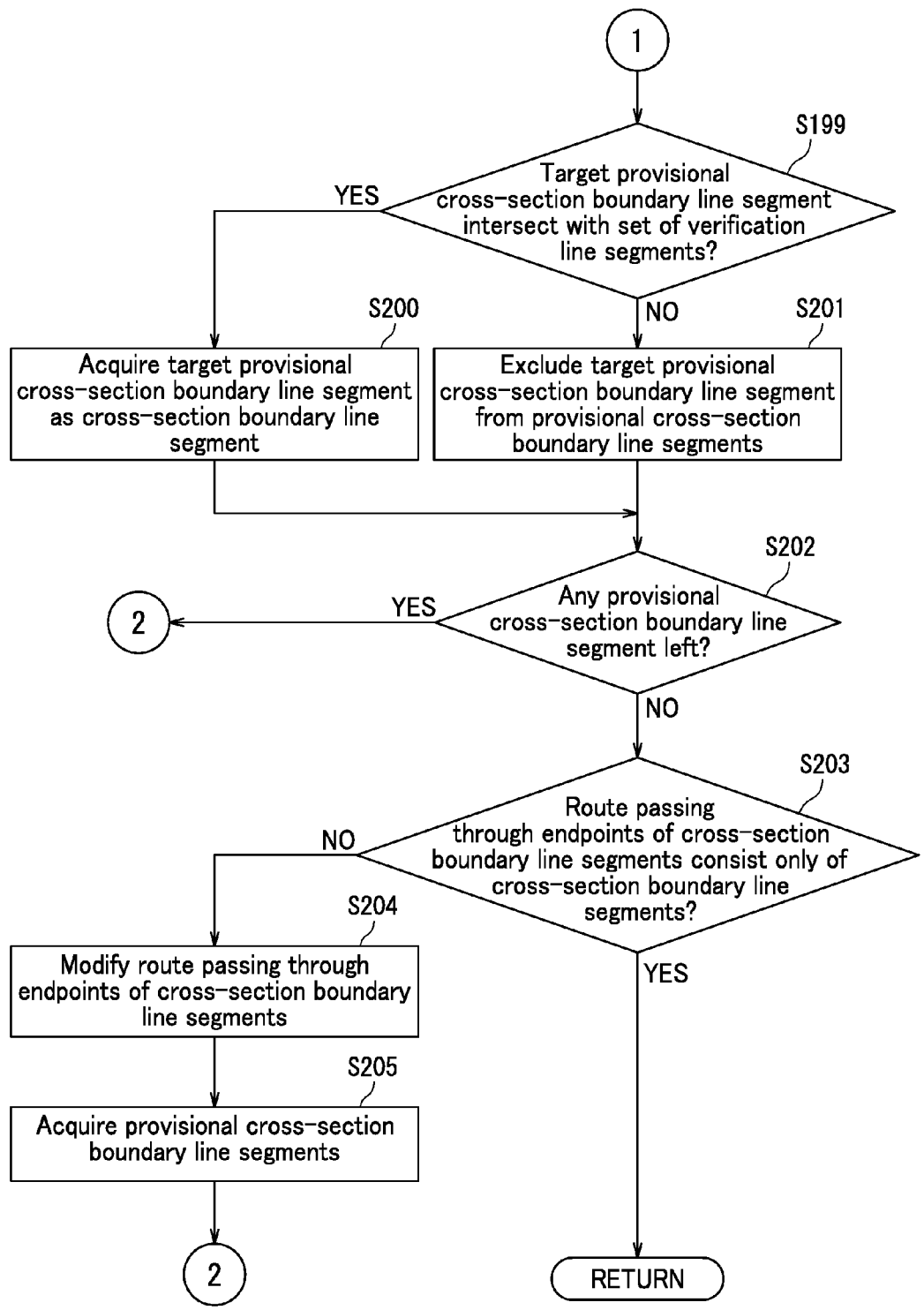

FIGS. 18 and 19 are a flowchart of the cross-section boundary line segment acquiring process illustrated in FIG. 4.

As illustrated in FIG. 18, the cross-section boundary line segment acquiring section 35*b* calls up a library of traveling salesman problem (TSP) solvers (Step S191).

Next, the cross-section boundary line segment acquiring section 35*b* acquires the shortest possible route passing through each of the endpoints acquired in Step S163 exactly once using the library called up in Step S191 (Step S192).

The cross-section boundary line segment acquiring section 35*b* then acquires line segments that make up the route acquired in Step S192 as provisional line segments for a cross-section boundary (Step S193). Hereinafter, the provisional line segments for a cross-section boundary are referred to as "provisional cross-section boundary line segments".

Figure 20:
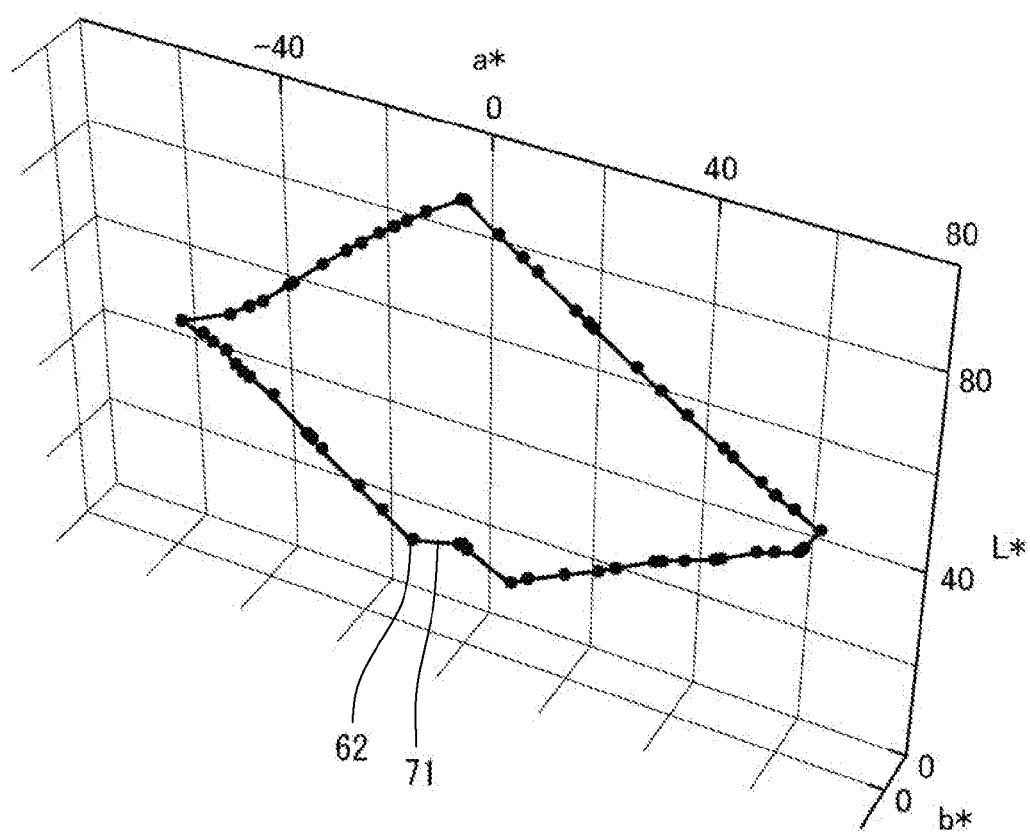
FIG. 20 is a diagram illustrating an example of cross-section boundary line segments acquired based on the endpoints illustrated in FIG. 17B.

In a case where the endpoints 62 of cross-section boundary line segments are acquired as illustrated in FIG. 17B in Step S163, for example, the cross-section boundary line segment acquiring section 35*b* acquires line segments 71 illustrated in FIG. 20 as the provisional cross-section boundary line segments in Step S193.

Figure 21:
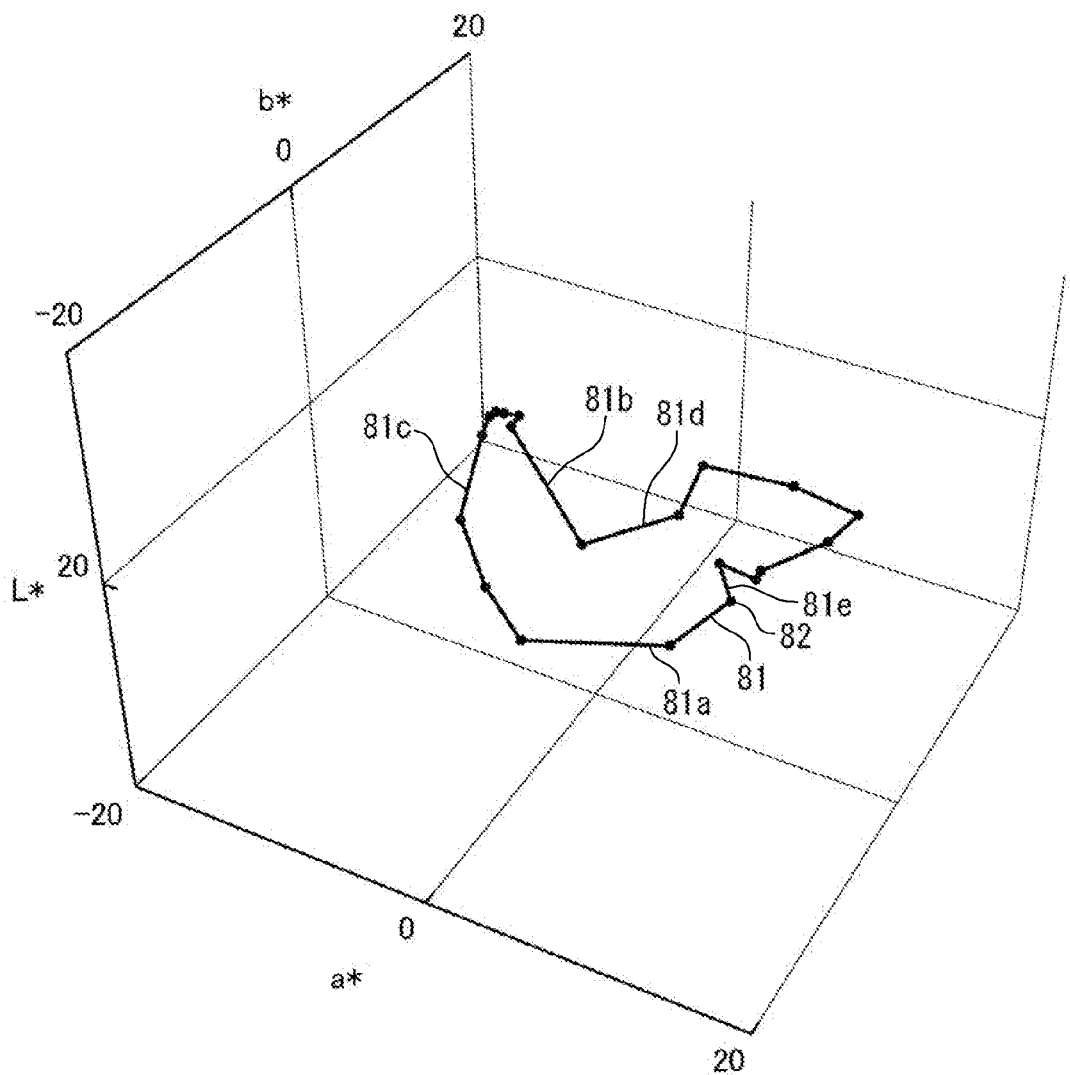
FIG. 21 is a diagram illustrating an example of provisional cross-section boundary line segments that are acquired when the color gamut of the MFP is sliced along a plane having a specific lightness.

The following describes the cross-section boundary line segment acquiring process illustrated in FIGS. 18 and 19 taking, as an example, a case where line segments 81 illustrated in FIG. 21 are acquired as the provisional cross-section boundary line segments in Step S193. The line segments 81 illustrated in FIG. 21 are provisional cross-section boundary line segments that are acquired when the color gamut of the MFP 20 is sliced along a plane having a lightness L of "19". In other words, the line segments 81 illustrated in FIG. 21 are provisional cross-section boundary line segments of a low-lightness portion of the color gamut of the MFP 20. Endpoints 82 of the line segments 81 are the endpoints acquired in Step S163.

Subsequent to Step S193, as illustrated in FIG. 18, the cross-section boundary line segment acquiring section 35*b* chooses one of the provisional cross-section boundary line segments acquired in Step S193 as a target provisional cross-section boundary line segment (Step S194).

Next, the cross-section boundary line segment acquiring section 35*b* acquires a plane for verification of the target provisional cross-section boundary line segment (Step S195). Hereinafter, the plane for verification of the target provisional cross-section boundary line segment is referred to as "a verification plane". More specifically, the cross-section boundary line segment acquiring section 35*b* acquires, as the verification plane, a plane intersecting with the target provisional cross-section boundary line segment at a point other than endpoints thereof. For example, the cross-section boundary line segment acquiring section 35*b* acquires, as the verification plane, a plane perpendicularly intersecting with the target provisional cross-section boundary line segment at a midpoint of the target provisional cross-section boundary line segment. Suppose coordinates of the midpoint of the target provisional cross-section boundary line segment are $\{L_m, a_m, b_m\}$, and a directional vector of the target provisional cross-section boundary line segment is defined by expression (8) shown below. Then the expression (8) represents a normal vector of the plane perpendicular to the target provisional cross-section boundary line segment, and therefore the verification plane is defined by equation (9) shown below.

$$\vec{n} \quad (8)$$

$$\vec{n} \cdot \{(L-L_m),(a-a_m),(b-b_m)\}=0 \quad (9)$$

Note that spatial coordinates (three-dimensional coordinates) of the midpoint of the target provisional cross-section boundary line segment can be readily acquired from coordinates of the two endpoints of the target provisional cross-section boundary line segment. Therefore, the computational burden for acquiring the verification plane can be reduced by acquiring, as the verification plane, a plane intersecting with the target provisional cross-section boundary line segment at the midpoint of the target provisional cross-section boundary line segment. However, the verification plane may be a plane intersecting with the target provisional cross-section boundary line segment at a point other than the midpoint of the provisional cross-section boundary line segment. For example, the verification plane may be a plane intersecting with the target provisional cross-section boundary line segment at a point included in the target provisional cross-section boundary line segment that is located at spatial coordinates with appropriate round figures.

The normal vector of the plane perpendicular to the target provisional cross-section boundary line segment can be readily acquired from the coordinates of the two endpoints of the target provisional cross-section boundary line segment. Therefore, the computational burden for acquiring the verification plane can be reduced by acquiring, as the verification plane, a plane perpendicular to the target provisional cross-section boundary line segment. However, the verification plane may be a plane other than the plane perpendicular to the target provisional cross-section boundary line segment.

Subsequent to Step S195, the cross-section boundary line segment acquiring section 35*b* acquires intersection points between the line segments acquired in Step S136 and the verification plane acquired in Step S195 as endpoints of line segments for verification of the target provisional cross-section boundary line segment (Step S196). Hereinafter, the line segments for verification of the target provisional cross-section boundary line segment are referred to as "verification line segments".

Next, the cross-section boundary line segment acquiring section 35*b* acquires the shortest possible route passing through each of the endpoints acquired in Step S196 exactly once using the library called up in Step S191 (Step S197).

Next, the cross-section boundary line segment acquiring section 35*b* acquires, as the verification line segments, line segments making up the route acquired in Step S197 (Step S198).

Next, as illustrated in FIG. 19, the cross-section boundary line segment acquiring section 35*b* determines whether or not a set of verification line segments acquired in Step S198 and the target provisional cross-section boundary line segment intersect with one another (Step S199). In a case where the set of verification line segments and the target provisional cross-section boundary line segment intersect with one another, the set of verification line segments and the target provisional cross-section boundary line segment intersect with one another at an intersection point between the verification plane and the target provisional cross-section boundary line segment.

Figure 22:
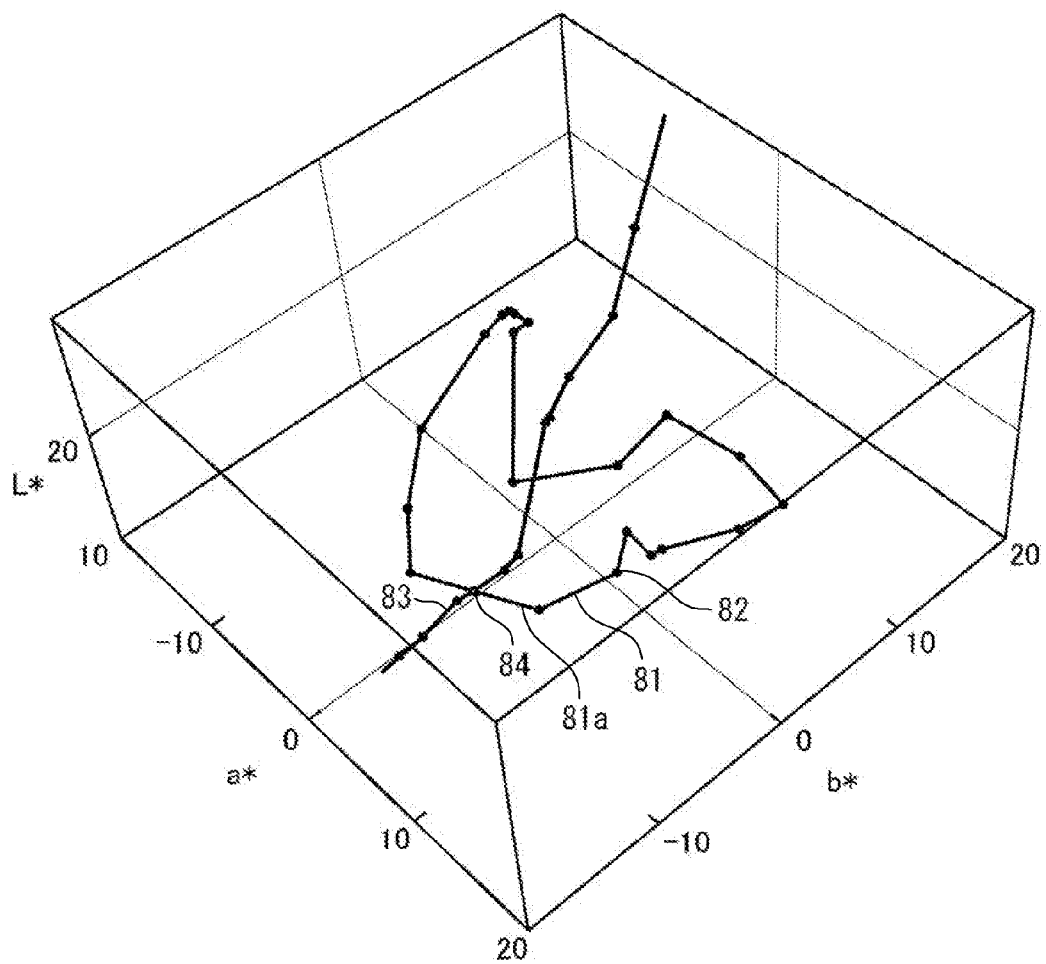
FIG. 22 is a diagram illustrating a state of a target provisional cross-section boundary line segment and a set of verification line segments intersecting with one another in the example illustrated in FIG. 21.

For example, in a case where a line segment 81*a* among the plurality of line segments (provisional cross-section boundary line segments) 81 illustrated in FIG. 21 is the target provisional cross-section boundary line segment, a set of verification line segments 83 acquired in Step S198 and the target provisional cross-section boundary line segment 81*a* intersect with one another at an intersection point 84 between the verification plane and the line segment 81*a* as illustrated in FIG. 22.

Figure 23:
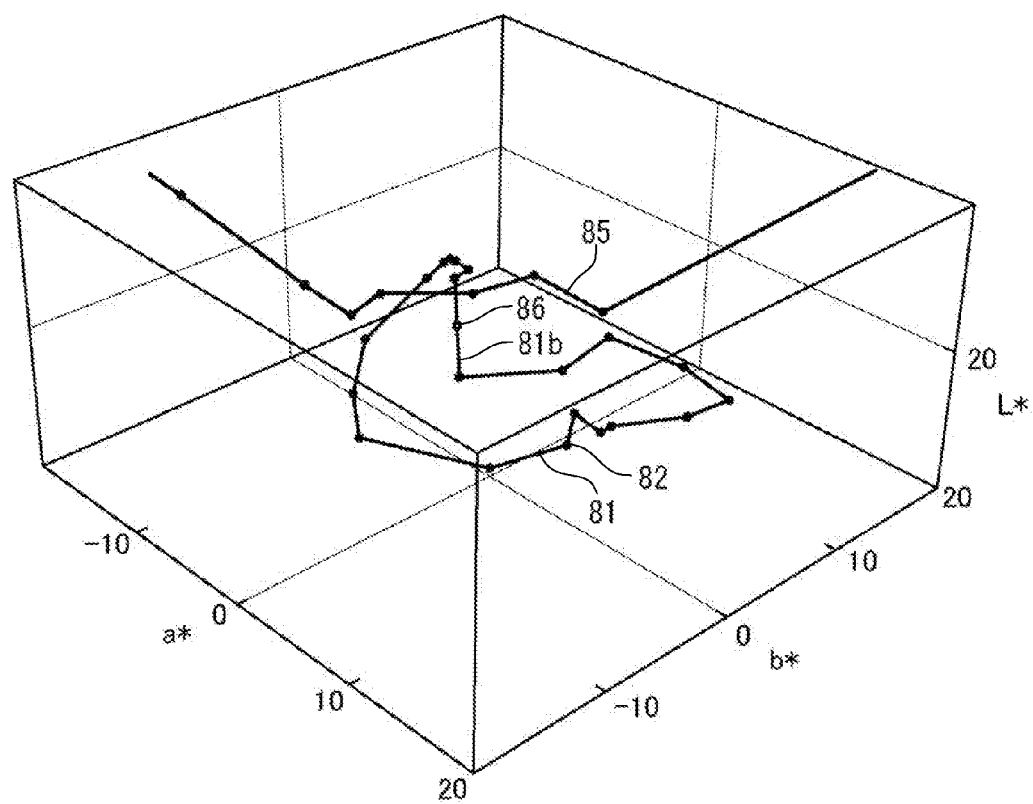
FIG. 23 is a diagram illustrating a state of a target provisional cross-section boundary line segment and a set of verification line segments not intersecting with one another in the example illustrated in FIG. 21.

For another example, in a case where a line segment 81*b* among the plurality of line segments (provisional cross-section boundary line segments) 81 illustrated in FIG. 21 is the target provisional cross-section boundary line segment, a set of verification line segments 85 acquired in Step S198 and the target provisional cross-section boundary line segment 81*b* do not intersect with one another at an intersection point 86 between the verification plane and the line segment 81*b* as illustrated in FIG. 23. That is, the line segment 81*b* and the set of line segments 85 are skew.

As illustrated in FIG. 19, when determining that the set of verification line segments acquired in Step S198 and the target provisional cross-section boundary line segment intersect with one another (YES in Step S199), the cross-section boundary line segment acquiring section 35*b* excludes the target provisional cross-section boundary line segment from the provisional cross-section boundary line segments and acquires the target provisional cross-section boundary line segment as a cross-section boundary line segment (Step S200).

When determining that the set of verification line segments acquired in Step S198 and the target provisional cross-section boundary line segment do not intersect with one another (NO in Step S199), the cross-section boundary line segment acquiring section 35*b* excludes the target provisional cross-section boundary line segment from the provisional cross-section boundary line segments (Step S201).

Subsequent to Step S200 or Step S201, the cross-section boundary line segment acquiring section 35*b* determines whether or not there is any provisional cross-section boundary line segment left (Step S202).

When determining that there is a provisional cross-section boundary line segment left (YES in Step S202), the cross-section boundary line segment acquiring section 35*b* performs Step S194 illustrated in FIG. 18.

When determining that there is no provisional cross-section boundary line segment left (NO in Step S202), the cross-section boundary line segment acquiring section 35*b* determines whether or not the route passing through each of the endpoints acquired in Step S163 exactly once consists only of the cross-section boundary line segments acquired in Step S200 (Step S203).

When determining that the route passing through each of the endpoints acquired in Step S163 exactly once does not consist only of the cross-section boundary line segments (NO in Step S203), the cross-section boundary line segment acquiring section 35*b* modifies the route by finding endpoints that are each not connected with two cross-section boundary line segments from the endpoints acquired in Step S163 and generating line segments connecting such endpoints in new combinations (Step S204). The cross-section boundary line segment acquiring section 35*b* then modifies the route such that the route does not sequentially pass through opposite endpoints of each line segment previously used as a provisional cross-section boundary line segment. In a case where there are a plurality of possible combinations of endpoints that are each not connected with two cross-section boundary line segments to be connected for a line segment, the cross-section boundary line segment acquiring section 35*b* preferably selects a combination of endpoints that are each not connected with two cross-section boundary line segments for the line segment so that the line segment connecting such endpoints has a shortest possible length.

Figure 24:
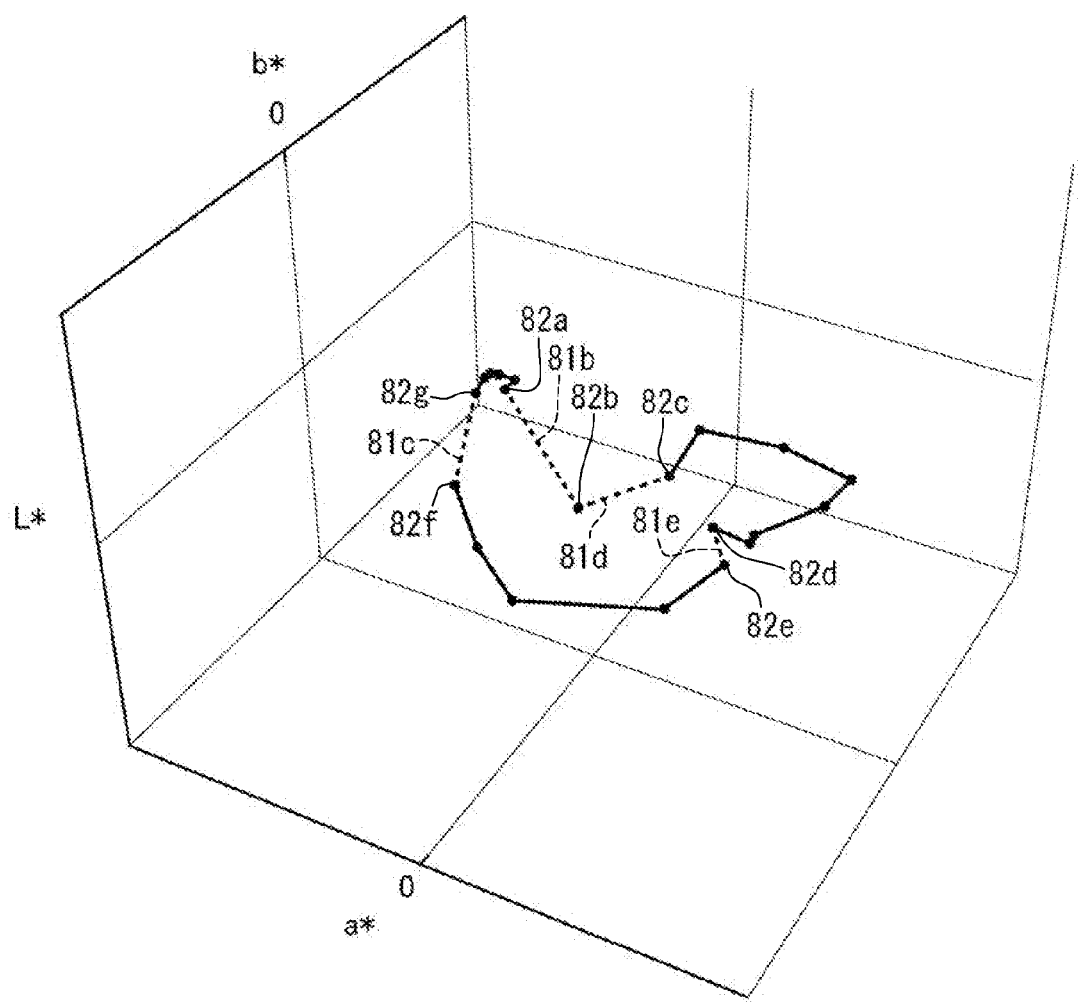
FIG. 24 is a diagram illustrating a route divided into a plurality of regions in the example illustrated in FIG. 21.

For example, in a case where the line segment 81*b*, a line segment 81*c*, a line segment 81*d*, and a line segment 81*e* among the line segments (provisional cross-section boundary line segments) 81 illustrated in FIG. 21 are not cross-section boundary line segments, the route illustrated in FIG. 21 is divided into three sets of line segments as illustrated in FIG. 24 after the line segment 81*b*, the line segment 81*c*, the line segment 81*d*, and the line segment 81*e* have been excluded. In the route divided as illustrated in FIG. 24, one endpoint 82*a* of the line segment 81*b* is connected with only one cross-section boundary line segment. An endpoint 82*b*, which is one end point of the line segment 81*d* as well as the other endpoint of the line segment 81*b*, is connected with no cross-section boundary line segment. The other endpoint 82*c* of the line segment 81*d* is connected with only one cross-section boundary line segment. One end point 82*d* and the other endpoint 82*e* of the line segment 81*e* are each connected with only one cross-section boundary line segment. One end point 82*f* and the other endpoint 82*g* of the line segment 81*c* are each connected with only one cross-section boundary line segment. After the route is divided as illustrated in FIG. 24, the cross-section boundary line segment acquiring section 35*b* for example generates a line segment connecting the endpoint 82*a* with the closest endpoint 82*g* rather than with the endpoint 82*b*. Furthermore, the cross-section boundary line segment acquiring section 35*b* for example generates a line segment connecting the endpoint 82*d* with the closest endpoint 82*c* rather than with the endpoint 82*e*.

Subsequent to step S204, as illustrated in FIG. 19, the cross-section boundary line segment acquiring section 35*b* acquires, as provisional cross-section boundary line segments, line segments that are not cross-section boundary line segments among the line segments making up the route modified in Step S204 (Step S205).

Subsequent to Step S205, the cross-section boundary line segment acquiring section 35b performs Step S194 illustrated in FIG. 18.

When determining that the route passing through each of the endpoints acquired in Step S163 exactly once consists only of the cross-section boundary line segments (YES in Step S203), the cross-section boundary line segment acquiring section 35b ends the cross-section boundary line segment acquiring process illustrated in FIGS. 18 and 19.

Figure 25:
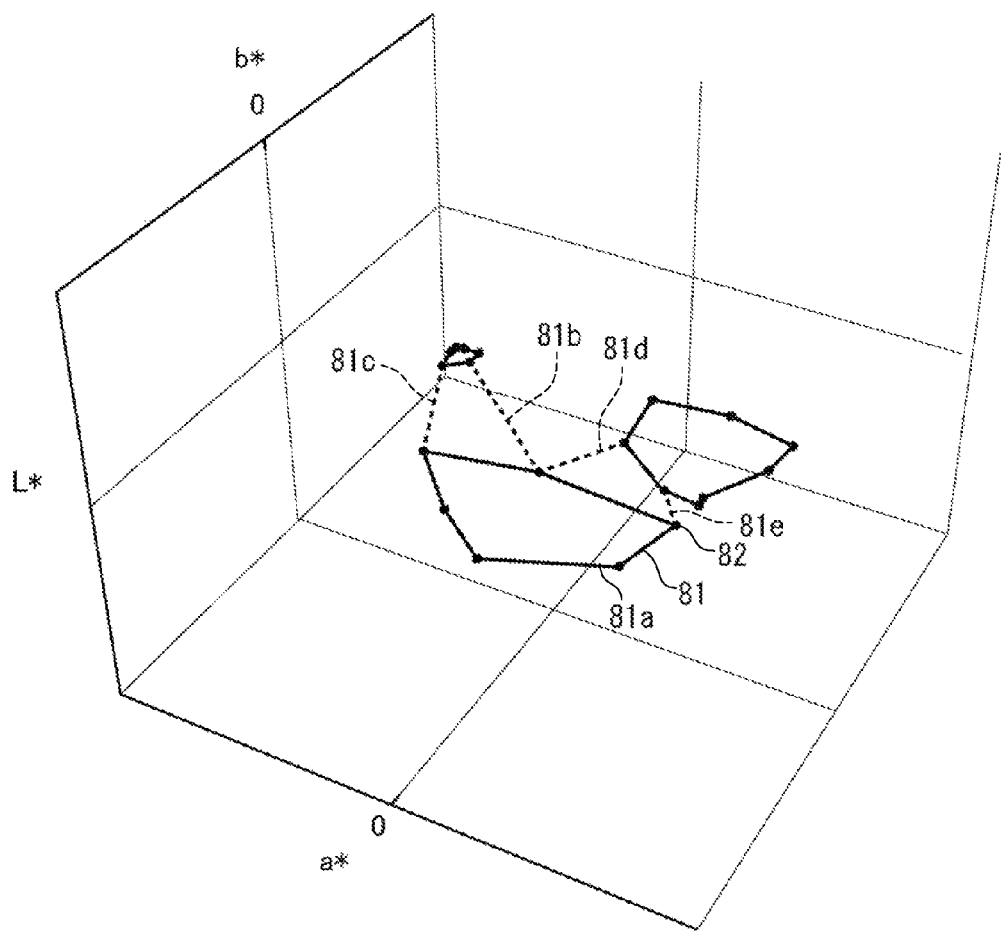
FIG. 25 is a diagram illustrating an actual cross-section in contrast to the example illustrated in FIG. 21.

For example, in a case where the line segment 81b, the line segment 81c, the line segment 81d, and the line segment 81e among the line segments (provisional cross-section boundary line segments) 81 illustrated in FIG. 21 are not cross-section boundary line segments, the cross-section boundary line segment acquiring section 35b finally acquires three routes each consisting only of cross-section boundary line segments as illustrated in FIG. 25 as a result of the cross-section boundary line segment acquiring process illustrated in FIGS. 18 and 19. That is, the cross-section boundary line segment acquiring section 35b acquires a cross-section formed from separate three regions as the cross-section of the color gamut of the MFP 20 taken on the plane having a lightness L of "19".

The cross-section boundary line segment acquiring section 35b repeats Steps S194 to S205 until it is determined that the route passing through each of the endpoints acquired in Step S163 exactly once consists only of cross-section boundary line segments. However, the number of times Steps S194 to S205 are repeated may be provided with an upper limit for a situation in which the route passing through each of the endpoints acquired in Step S163 exactly once does not come to consist only of cross-section boundary line segments no matter how many times Steps S194 to S205 are repeated.

After completion of the cross-section boundary line segment acquiring process in Step S103, as illustrated in FIG. 4, the controller 35 ends the operation illustrated in FIG. 4.

Note that the controller 35 is capable of performing various operations using cross-section boundary line segments acquired as a result of the operation illustrated in FIG. 4. For example, the controller 35 can cause the display 32 to display a cross-section boundary using the cross-section boundary line segments or determine whether a specified chromaticity value is inside or outside the cross-section boundary by executing the in/out-of-gamut determination program 34a.

Second Embodiment

The following describes a second embodiment of the present disclosure with reference to FIGS. 21 and 26 to 31. However, description of matter that is the same as for the first embodiment is omitted, and differences compared to the first embodiment are described. The second embodiment is different from the first embodiment in the cross-section boundary line segment acquiring process.

Figure 26:
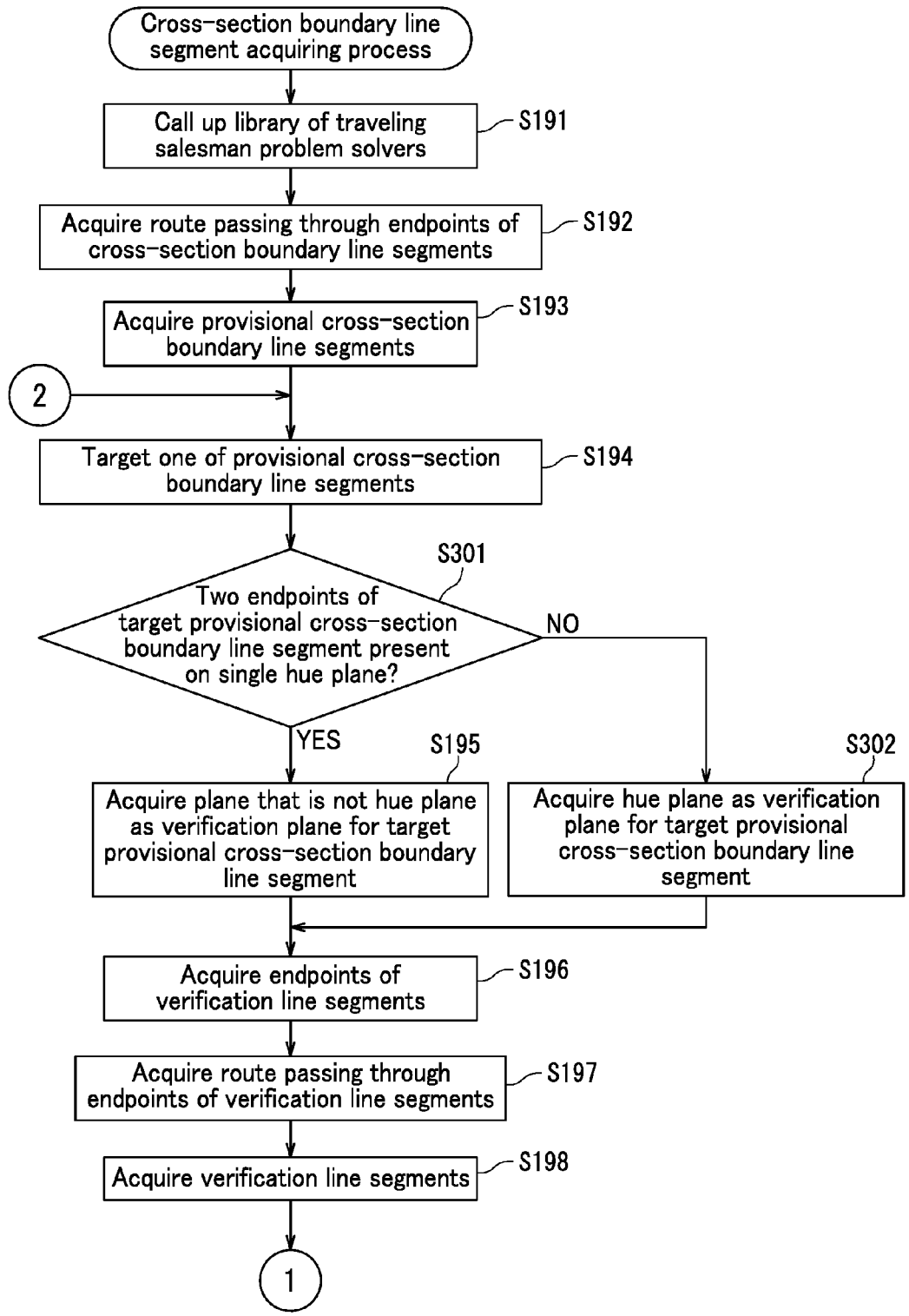
FIGS. 26 and 27 are a flowchart of a cross-section boundary line segment acquiring process according to a second embodiment of the present disclosure.
Figure 27:
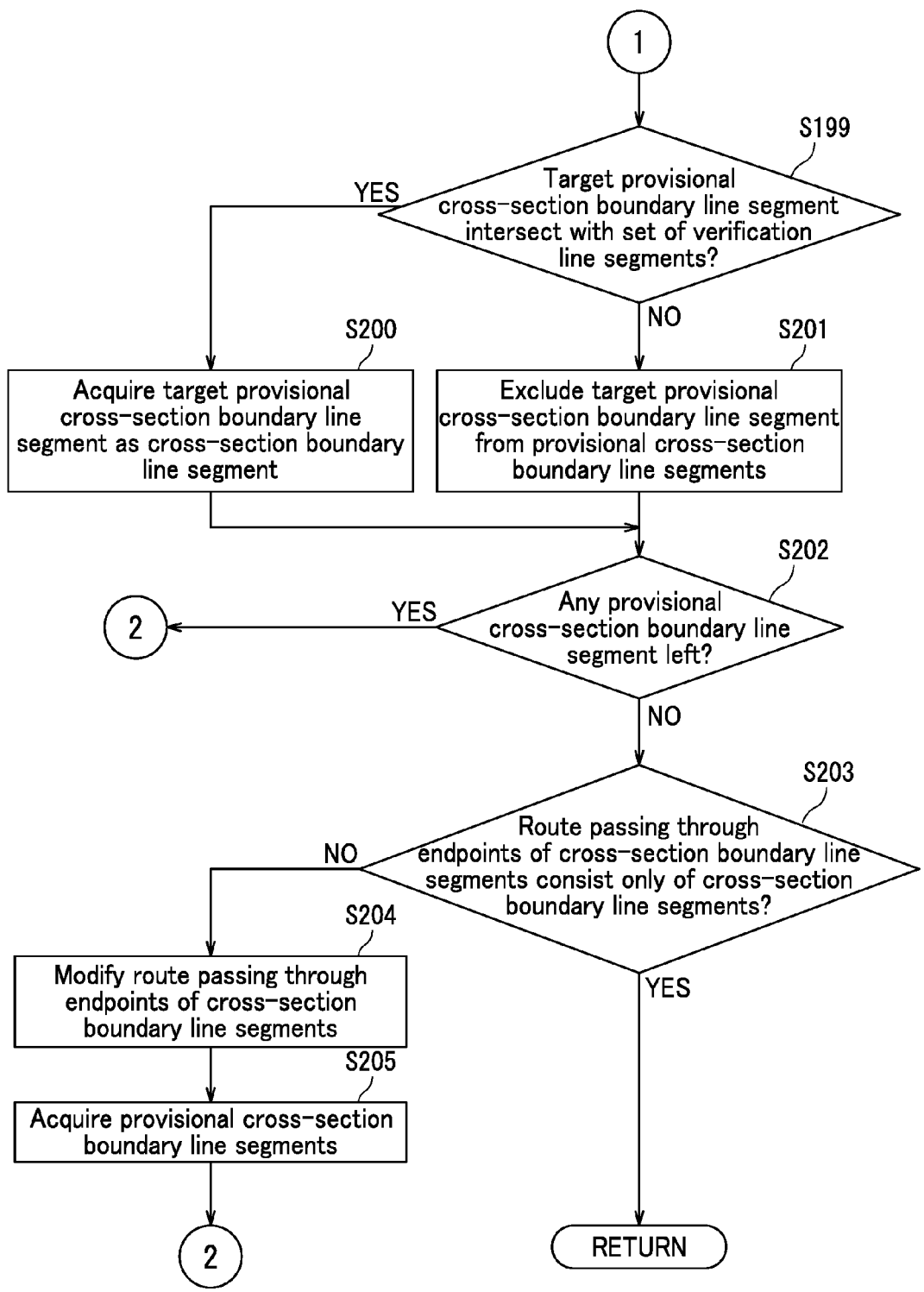

FIGS. 26 and 27 are a flowchart of the cross-section boundary line segment acquiring process according to the second embodiment. As illustrated in FIGS. 26 and 27, the cross-section boundary line segment acquiring process according to the second embodiment is different from the cross-section boundary line segment acquiring process according to the first embodiment described with reference to FIGS. 18 and 19 in that the cross-section boundary line segment acquiring process according to the second embodiment includes Steps S301 and S302.

The following describes the cross-section boundary line segment acquiring process illustrated in FIGS. 26 and 27 taking, as an example, a case where the line segments 81 illustrated in FIG. 21 are acquired as provisional cross-section boundary line segments in Step S193 as in the case of the first embodiment.

As illustrated in FIG. 26, the cross-section boundary line segment acquiring section 35b determines whether or not the two endpoints of the target provisional cross-section boundary line segment are present on a single hue plane (Step S301).

When determining that the two endpoints of the target provisional cross-section boundary line segment are not present on a single hue plane (NO in Step S301), the cross-section boundary line segment acquiring section 35b acquires, as the verification plane, a hue plane intersecting with the target provisional cross-section boundary line segment at a point other than the endpoints thereof (Step S302). For example, the cross-section boundary line segment acquiring section 35b acquires, as the verification plane, a hue plane extending through the midpoint of the target provisional cross-section boundary line segment. Suppose coordinates of the midpoint of the target provisional cross-section boundary line segment are M $\{L_m, a_m, b_m\}$, and a normal vector of a hue plane including M $\{L_m, a_m, b_m\}$ is defined by expression (10) shown below. Then the normal vector of the hue plane including M $\{L_m, a_m, b_m\}$ is represented by a cross product as represented by equation (11) shown below based on a black point K $\{0, 0, 0\}$ present on the L axis, a white point W $\{100, 0, 0\}$ present on the L axis, and M $\{L_m, a_m, b_m\}$. Accordingly, an equation of the verification plane, that is, the hue plane including M $\{L_m, a_m, b_m\}$ is equation (12) shown below.

$$\vec{n} \tag{10}$$

$$\vec{n} = \underline{KM} \times \overrightarrow{KW} \tag{11}$$

$$\vec{n} \cdot \{(L-L_m), (a-a_m), (b-b_m)\} = 0 \tag{12}$$

When determining that the two endpoints of the target provisional cross-section boundary line segment are present on a single hue plane (YES in Step S301), the cross-section boundary line segment acquiring section 35b acquires, as the verification plane, a plane that is not a hue plane and intersects with the target provisional cross-section boundary line segment at a point other than the endpoints thereof (Step S195). For example, the cross-section boundary line segment acquiring section 35b acquires, as the verification plane, a plane that is not a hue plane and extends through the midpoint of the target provisional cross-section boundary line segment. In a case where the two endpoints of the target provisional cross-section boundary line segment are present on a single hue plane, any other hue plane extending through a point included in the target provisional cross-section boundary line segment other than the endpoints thereof does not intersect with the target provisional cross-section boundary line segment but includes the target provisional cross-section boundary line segment. Such a hue plane is therefore not suitable as the verification plane for the target provisional cross-section boundary line segment. In a case where the two endpoints of the target provisional cross-section boundary line segment are present on a single hue plane, therefore, a plane that is not a hue plane is preferably acquired as the verification plane. In a case where the plane acquired in Step S161 is not a plane of constant lightness, for example, the cross-section boundary line segment acquiring section 35b may acquire, as the verification plane, a plane of constant lightness that intersects with the target provisional cross-section boundary line segment at a point other than the endpoints thereof in Step S195.

Note that the spatial coordinates (three-dimensional coordinates) of the midpoint of the target provisional cross-section boundary line segment can be readily acquired from the coordinates of the two endpoints of the target provisional cross-section boundary line segment. Therefore, the computational burden for acquiring the verification plane can be reduced by acquiring, as the verification plane, a plane intersecting with the target provisional cross-section boundary line segment at the midpoint of the target provisional cross-section boundary line segment in Step S195 or Step S302. However, the verification plane may be a plane intersecting with the target provisional cross-section boundary line segment at a point of the target provisional cross-section boundary line segment other than the midpoint. For example, the verification plane may be a plane intersecting with the target provisional cross-section boundary line segment at a point included in the target provisional cross-section boundary line segment that is located at spatial coordinates with appropriate round figures.

Subsequent to Step S195 or Step S302, the cross-section boundary line segment acquiring section 35b acquires intersection points between the line segments acquired in Step S136 and the verification plane acquired in Step S195 or Step S302 as endpoints of verification line segments (Step S196).

As illustrated in FIG. 27, as in the first embodiment, the cross-section boundary line segment acquiring section 35b determines whether or not a set of verification line segments acquired in Step S198 and the target provisional cross-section boundary line segment intersect with one another (Step S199). In a case where the set of verification line segments and the target provisional cross-section boundary line segment intersect with one another, the set of verification line segments and the target provisional cross-section boundary line segment intersect with one another at an intersection point between the verification plane and the target provisional cross-section boundary line segment as in the first embodiment.

Figure 28:
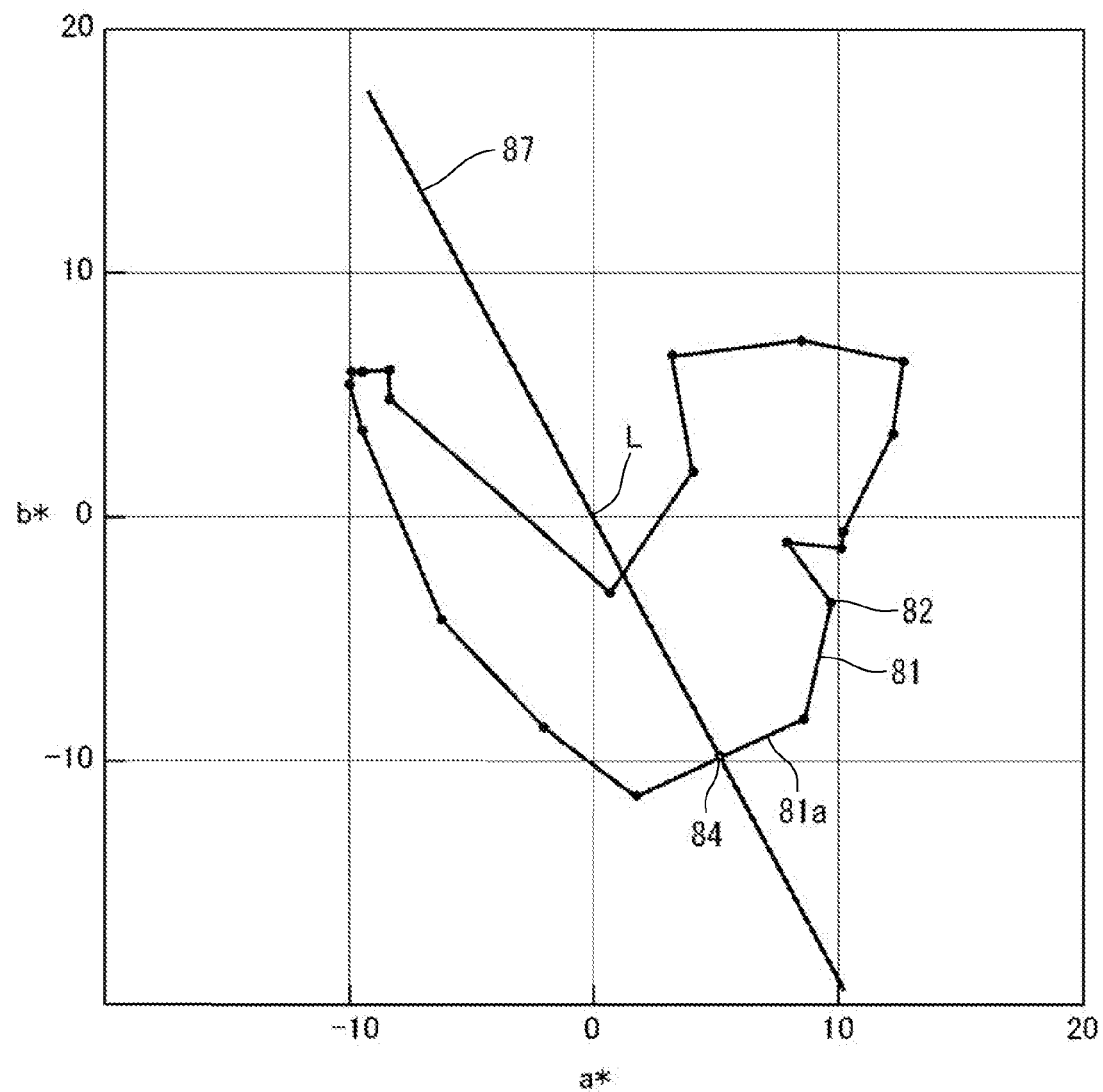
FIG. 28 is a diagram illustrating a state of a target provisional cross-section boundary line segment and a verification plane intersecting with one another in the example illustrated in FIG. 21.
Figure 29:
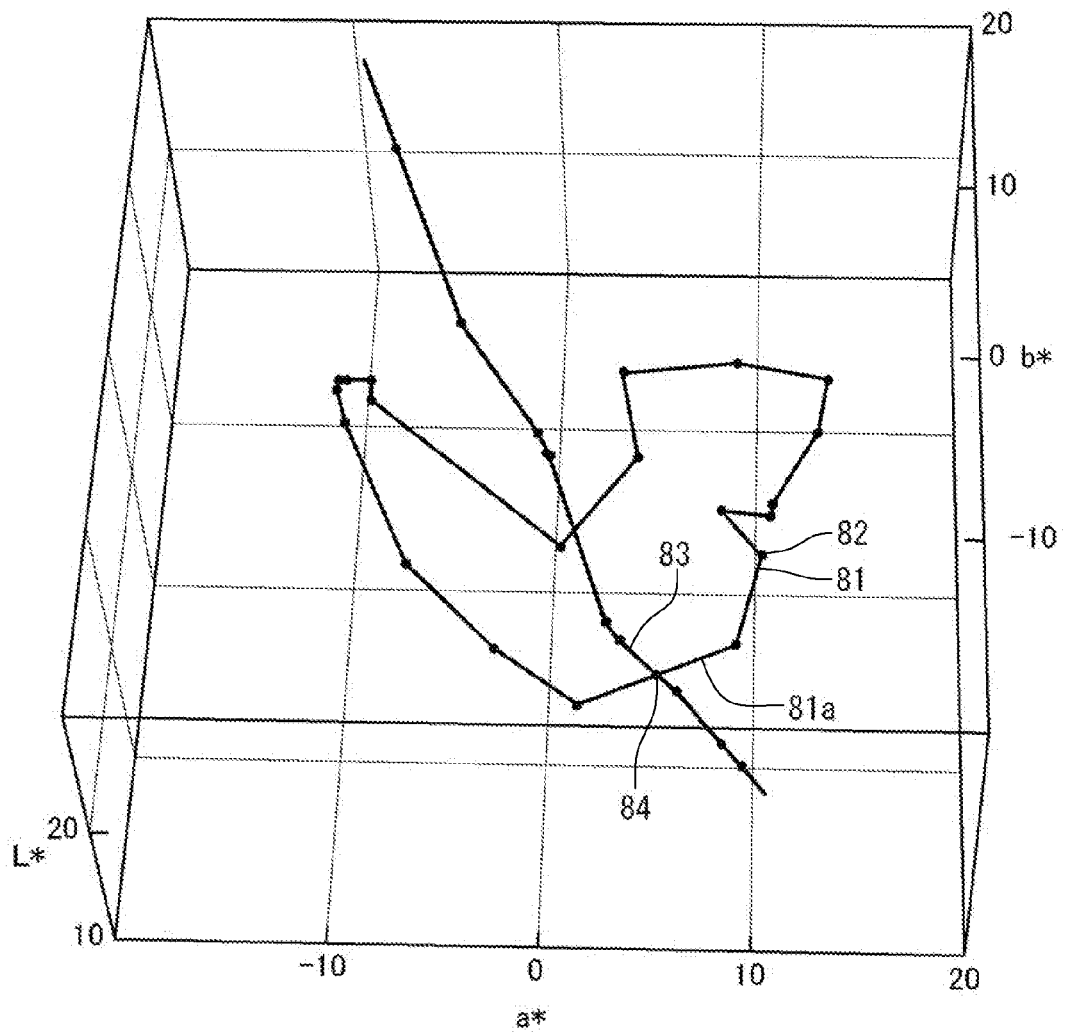
FIG. 29 is a diagram illustrating another state of a target provisional cross-section boundary line segment and a set of verification line segments intersecting with one another in the example illustrated in FIG. 21.

For example, in a case where the line segment 81a among the plurality of line segments (provisional cross-section boundary line segments) 81 illustrated in FIG. 21 is the target provisional cross-section boundary line segment, and a verification plane 87 that is a hue plane and the target provisional cross-section boundary line segment 81a intersect with one another at the intersection point 84 as illustrated in FIG. 28, the set of verification line segments 83 acquired in Step S198 and the target provisional cross-section boundary line segment 81a intersect with one another at the intersection point 84 as illustrated in FIG. 29.

Figure 30:
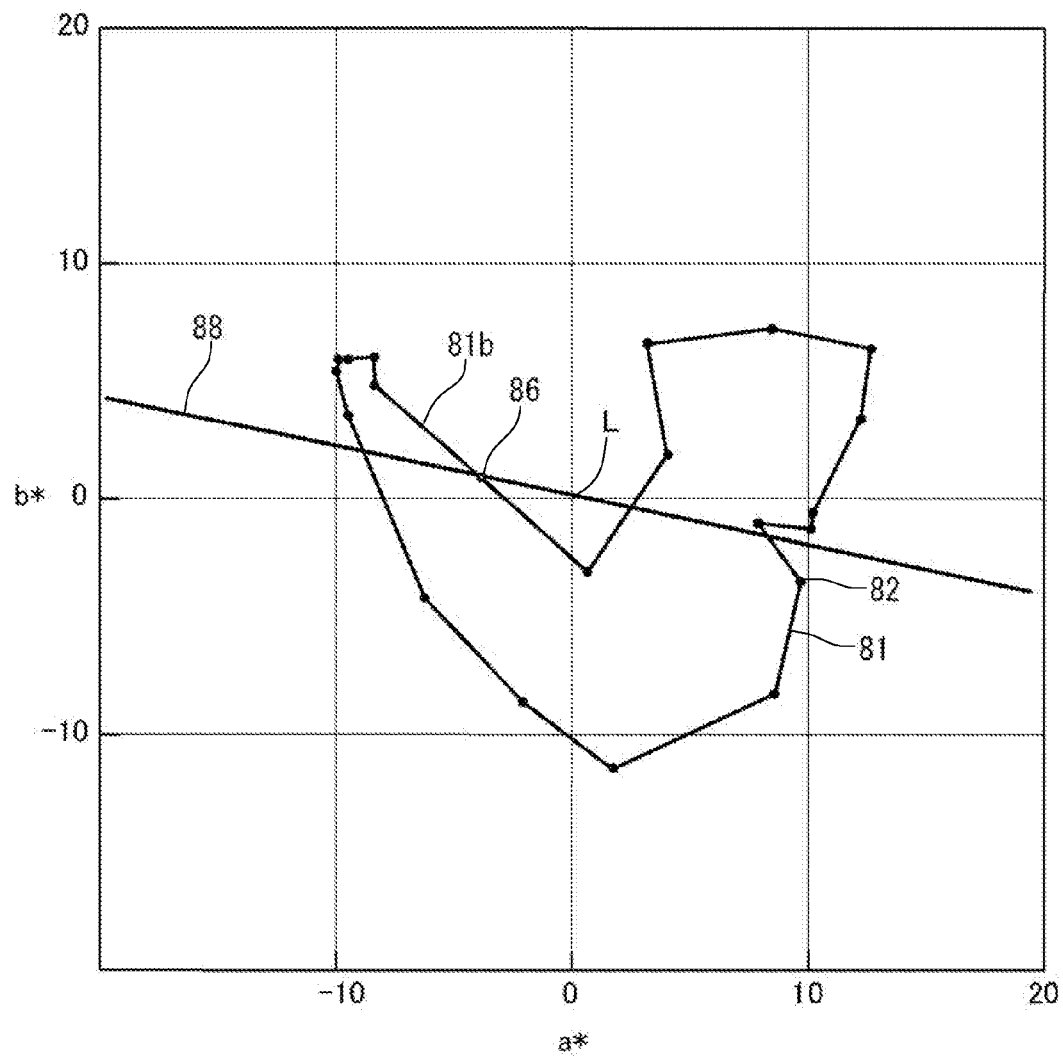
FIG. 30 is a diagram illustrating another state of a target provisional cross-section boundary line segment and a verification plane intersecting with one another in the example illustrated in FIG. 21.
Figure 31:
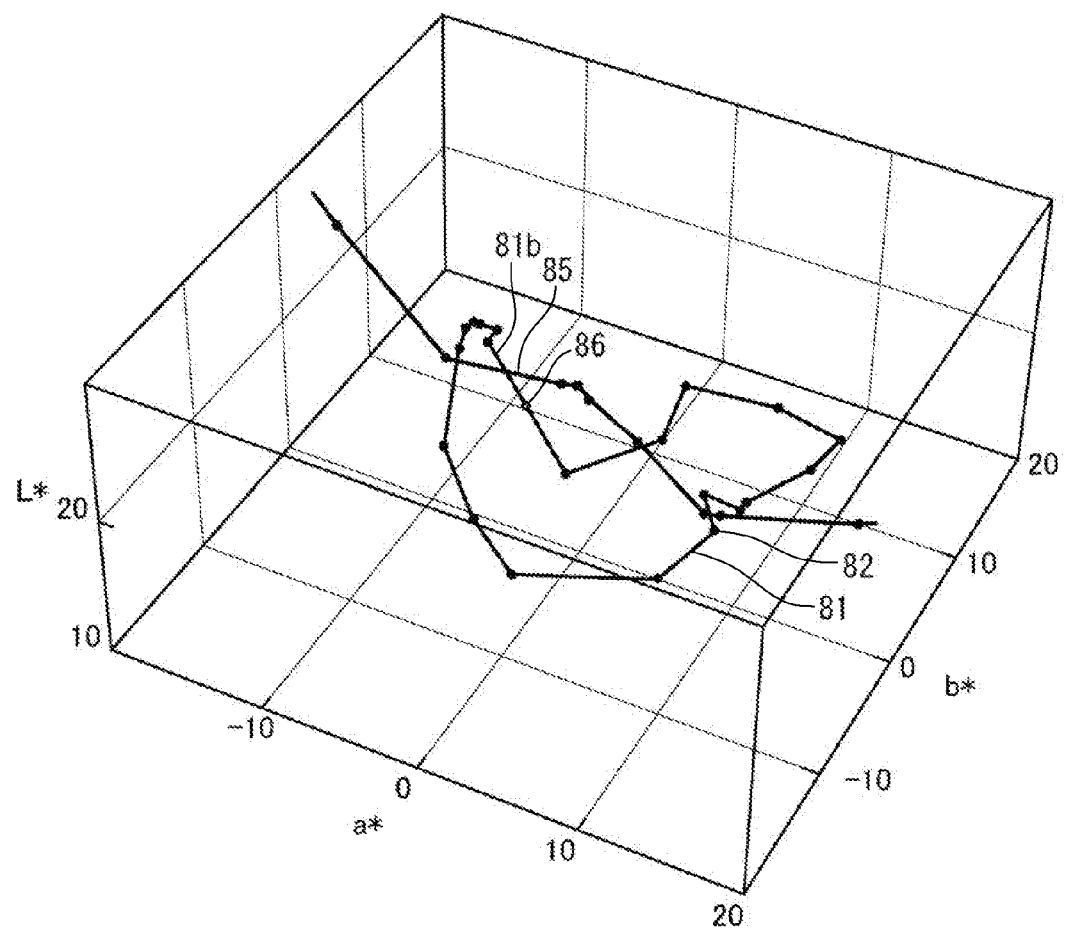
FIG. 31 is a diagram illustrating another state of a target provisional cross-section boundary line segment and a set of verification line segments not intersecting with one another in the example illustrated in FIG. 21.

For another example, in a case where the line segment 81b among the plurality of line segments (provisional cross-section boundary line segments) 81 illustrated in FIG. 21 is the target provisional cross-section boundary line segment, and a verification plane 88 that is a hue plane and the target provisional cross-section boundary line segment 81b intersect with one another at the intersection point 86 as illustrated in FIG. 30, the set of verification line segments 85 acquired in Step S198 and the target provisional cross-section boundary line segment 81b do not intersect with one another at the intersection point 86 as illustrated in FIG. 31. That is, the target provisional cross-section boundary line segment 81b and the set of verification line segments 85 are skew.

The in/out-of-gamut determination device 30 acquires, as the verification plane, a hue plane intersecting with the target provisional cross-section boundary line segment at a point other than the endpoints thereof (Step S302). It is noted here that a ratio of b value relative to a value is constant in the Lab value of the hue plane. Accordingly, the configuration of the in/out-of-gamut determination device 30 can reduce the processing burden for acquiring the endpoints of the verification line segments as well as the processing burden for acquiring the verification plane, compared to a configuration in which a plane that is not a hue plane or a plane of constant lightness is acquired as the verification plane for the target provisional cross-section boundary line segment.

As described above, the in/out-of-gamut determination device 30 according to the embodiments of the present disclosure acquires, as provisional cross-section boundary line segments, line segments making up the shortest possible route passing through exactly once each of the intersection points between line segments for defining the boundary of the color gamut of the MFP 20 (i.e., color gamut boundary line segments) and a specific plane. With respect to each of the acquired provisional cross-section boundary line segments, the in/out-of-gamut determination device 30 acquires the provisional cross-section boundary line segment as a confirmed line segment for defining the cross-section boundary (i.e., as a confirmed cross-section boundary line segment) if the provisional cross-section boundary line segment and the set of verification line segments intersect with one another. As a result, even if an actual cross-section of the color gamut of the MFP 20 taken on a specific plane has a shape with a depression or an actual cross-section of the color gamut of the MFP 20 taken on a specific plane is formed from a plurality of separate regions, a difference between the actual cross-section and a cross-section to be acquired by the in/out-of-gamut determination device 30 can be reduced.

In contrast, a cross-section acquired by a typical color gamut cross-section acquiring method may be different from an actual cross-section.

Figure 32A:
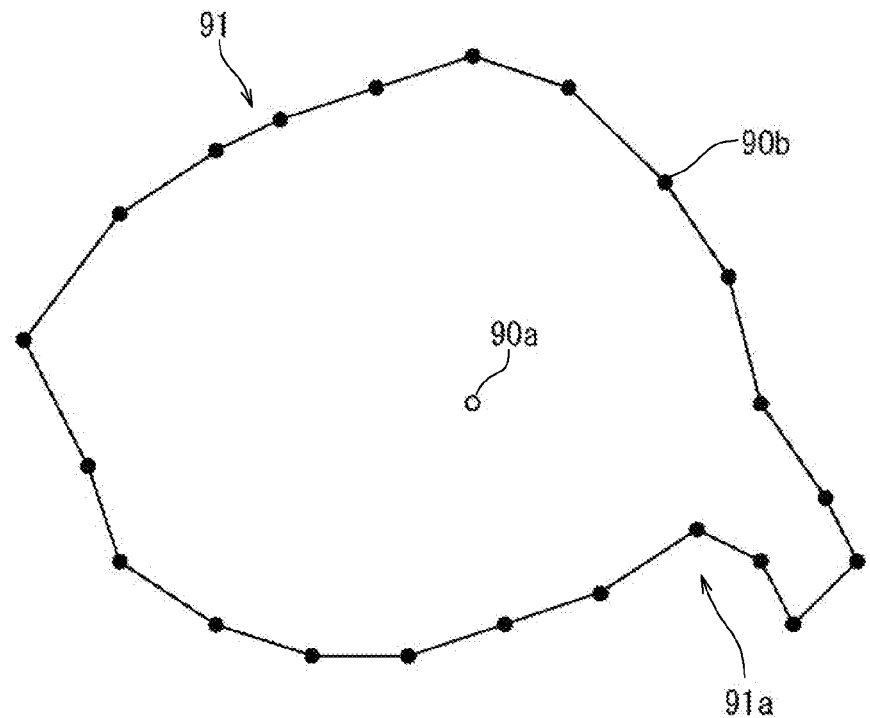
FIG. 32A is a diagram illustrating an example of an actual cross-section.
Figure 32B:
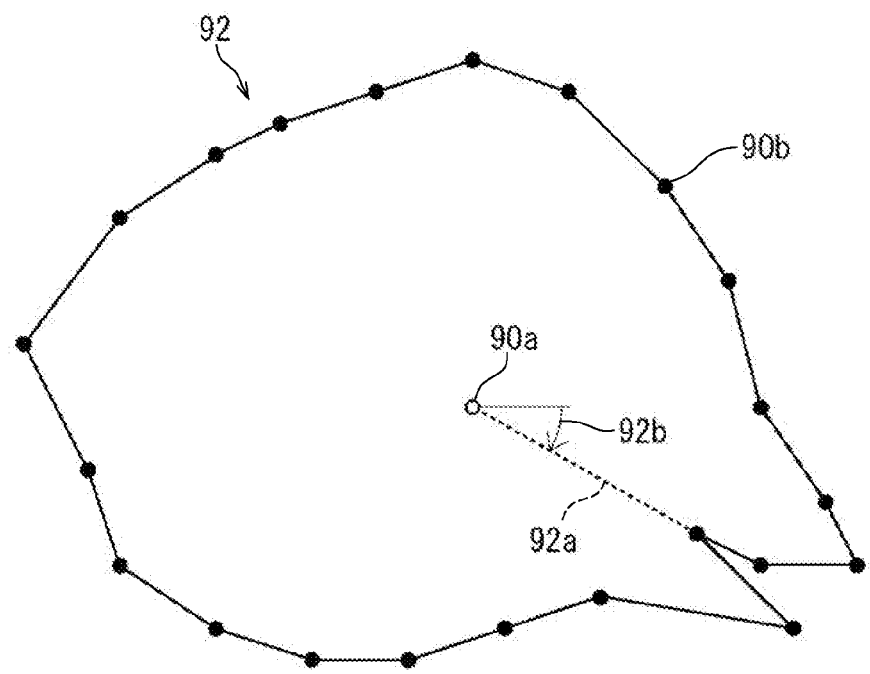
FIG. 32B is a diagram illustrating an example of a cross-section acquired from a color gamut illustrated in FIG. 32A by a typical color gamut cross-section acquiring method.

For example, in a case where an actual cross-section is a cross-section 91 having a shape with a depression 91a as illustrated in FIG. 32A, a corresponding cross-section to be acquired by the typical color gamut cross-section acquiring method is a false cross-section 92 illustrated in FIG. 32B. More specifically, the typical color gamut cross-section acquiring method takes a point representing an average of all intersection points 90b as a center point 90a as illustrated in FIG. 32B. The typical color gamut cross-section acquiring method then acquires line segments 92a by connecting the center point 90a with each of the intersection points 90b and uses one of the line segments 92a as a reference (0°) to determine an angle 92b of each line segment 92a to the reference on an intersection point 90b by intersection point 90b basis. Next, line segments are acquired by connecting the intersection points 90b in decreasing order of the angle 92b. As a result, the false cross-section 92 illustrated in FIG. 32B is acquired rather than the actual cross-section 91 illustrated in FIG. 32A.

Figure 33:
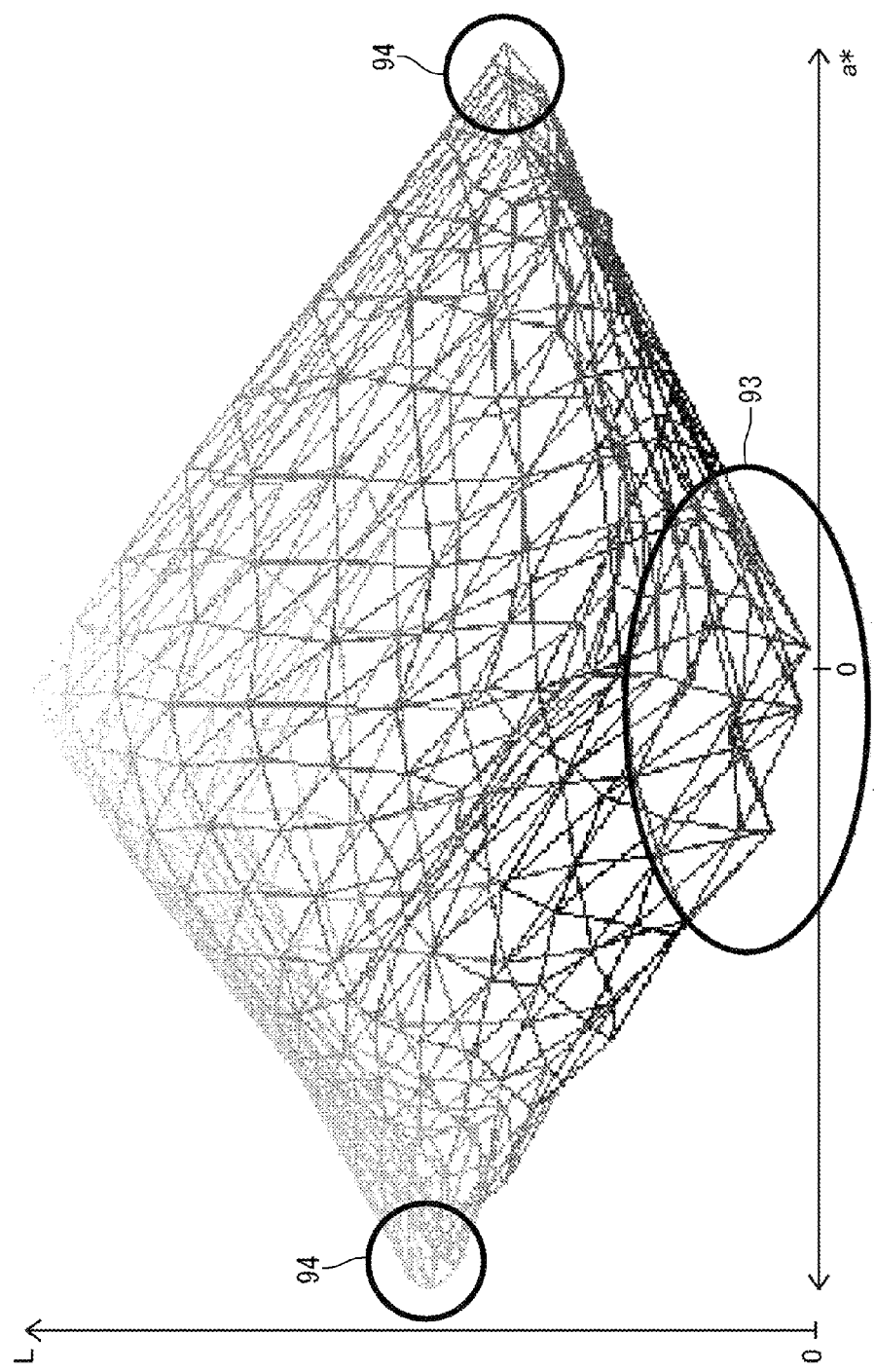
FIG. 33 is a diagram illustrating a color gamut of a generic printer in a Lab color space.
Figure 34:
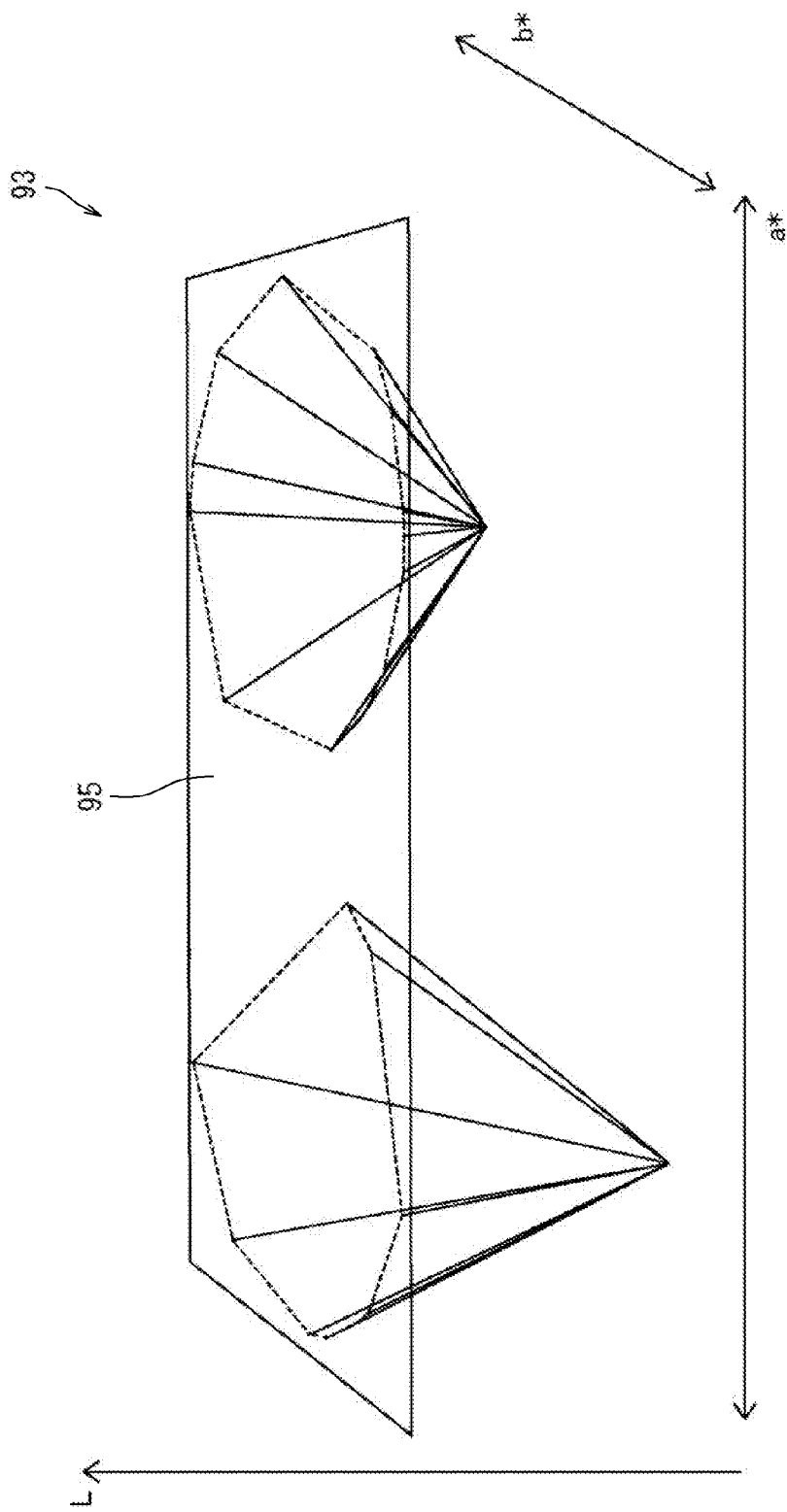
FIG. 34 is a diagram illustrating a portion of a color gamut of a generic printer in a Lab color space.
Figure 35A:
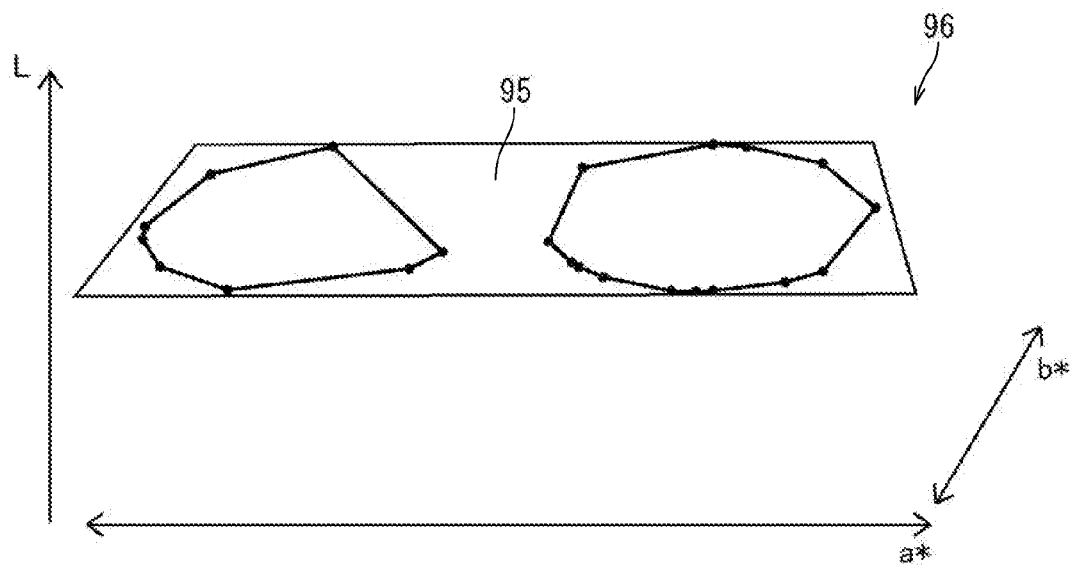
FIG. 35A is a diagram illustrating an example of an actual cross-section of the color gamut illustrated in FIG. 34 taken on a plane of constant lightness.
Figure 35B:
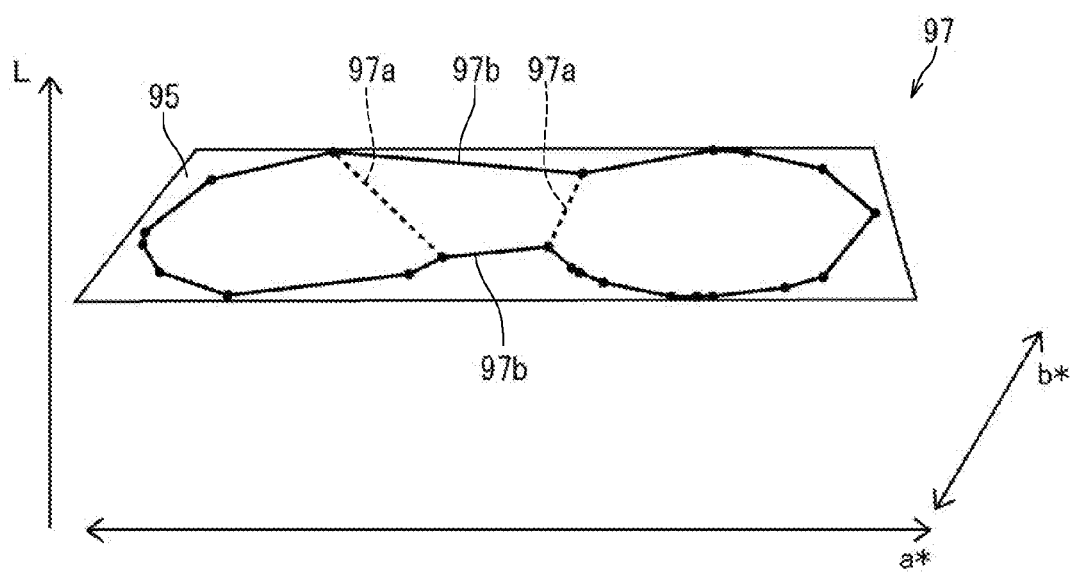
FIG. 35B is a diagram illustrating an example of a cross-section acquired from the color gamut illustrated in FIG. 34 by a typical color gamut cross-section acquiring method.

Furthermore, in a case where an outermost shell of a color gamut of a printer has irregularities, an actual cross-section of the color gamut taken on a plane extending through irregularities of the outermost shell of the color gamut is formed from a plurality of separate regions. The outermost shell of the color gamut of the printer has irregularities because the limit of the amount of adhesion of a cyan toner, a magenta toner, a yellow toner, and a black toner to a recording medium varies from toner to toner depending on the properties of the respective toners. Furthermore, the outermost shell of the color gamut of the printer has irregularities because the amount of adhesion of the toners to a recording medium varies from toner to toner depending on capability of the printer itself. Accordingly, the outermost shell of the color gamut of the printer is for example likely to have irregularities in a low-lightness portion 93 and in a high-chroma portion 94 as illustrated in FIG. 33. The reason for the above is that a greater amount of toner needs to be caused to adhere to the recording medium with respect to the low-lightness portion 93 and the high-chroma portion 94. For example, in a case where the outermost shell of the color gamut has irregularities in the low-lightness portion 93 as illustrated in FIG. 34, an actual cross-section 96 of the color gamut taken on a plane 95 of constant lightness extending through the low-lightness portion 93 is formed from a plurality of separate regions as illustrated in FIG. 35A. However, a corresponding cross-section acquired by the typical color gamut cross-section acquiring method is a false cross-section 97 formed of one region as illustrated in FIG. 35B. FIG. 35B does not include a line segment 97a, which is one of the line segments of the boundary of the actual cross-section 96 (see FIG. 35A), and includes a line segment 97b, which does not exist in the actual cross-section 96.

Furthermore, the in/out-of-gamut determination device 30 according to the embodiments of the present disclosure acquires new provisional cross-section boundary line segments in a case where the previously acquired provisional cross-section boundary line segments include those that each do not intersect with a corresponding set of verification line segments. With respect to each of the acquired new provisional cross-section boundary line segments, the in/out-of-gamut determination device 30 acquires the new provisional cross-section boundary line segment as a confirmed line segment for defining the cross-section boundary, that is, as a confirmed cross-section boundary line segment if the new provisional cross-section boundary line segment and a new set of verification line segments intersect with one another. Consequently, a difference between the actual cross-section and the cross-section to be acquired by the in/out-of-gamut determination device 30 can be reduced.

Furthermore, the in/out-of-gamut determination device 30 according to the embodiments of the present disclosure acquires a route using a traveling salesman problem solver (Step S192). Thus, the in/out-of-gamut determination device 30 can reduce the processing burden for acquiring a cross-section of the color gamut of the MFP 20 taken on a specific plane. Alternatively, the in/out-of-gamut determination device 30 may acquire the shortest possible route passing through each of the endpoints acquired in Step S163 exactly once without using a traveling salesman problem solver.

Furthermore, the in/out-of-gamut determination device 30 according to the embodiments of the present disclosure acquires a plane of constant hue including a specified point X $\{L_x, a_x, b_x\}$ in accordance with the equation (4) and acquires intersection points between the plane and the color gamut boundary line segments as endpoints of cross-section boundary line segments. The in/out-of-gamut determination device 30 then acquires cross-section boundary line segments using a library of traveling salesman problem solvers. The in/out-of-gamut determination device 30 can therefore acquire the cross-section boundary line segments for a cross-section of the color gamut of the MFP 20 of a hue to which the specified point X $\{L_x, a_x, b_x\}$ belongs without converting Lab values to CHL (chroma, hue, lightness) values one by one.

According to the embodiments of the present disclosure, Step S161 is performed after Step S101. However, Step S161 may be performed before Step S101.

According to the embodiments of the present disclosure, the cross-section boundary line segment acquiring section 35b selects a combination of endpoints that are each not connected with two cross-section boundary line segments for a line segment so that the line segment connecting such endpoints has a shortest possible length when modifying the route in Step S204. However, the cross-section boundary line segment acquiring section 35b may generate a line segment connecting endpoints that are each not connected with two cross-section boundary line segments in a combination other than the combination that allows the line segment connecting endpoints that are each not connected with two cross-section boundary line segments to have a shortest possible length. For example, when modifying the route in Step S204, the cross-section boundary line segment acquiring section 35b may generate a line segment connecting endpoints that are each not connected with two cross-section boundary line segments so that the line segment connecting endpoints that are each not connected with two cross-section boundary line segments does not intersect with any of the cross-section boundary line segments. By generating such a line segment, acquisition of a provisional cross-section boundary line segment that cannot be a cross-section boundary line segment is prevented. Thus, the cross-section boundary line segment acquiring process can be finished sooner.

According to the embodiments of the present disclosure, the cross-section boundary line segment acquiring section 35b verifies all the provisional cross-section boundary line segments using the verification line segments. However, when no more combinations for a provisional cross-section boundary line segment remain, the cross-section boundary line segment acquiring section 35b may acquire a provisional cross-section boundary line segment in the last combination as a cross-section boundary line segment without performing the verification using the verification line segments. By omitting the verification using the verification line segments, the cross-section boundary line segment acquiring process can be finished sooner. For example, in a case where four endpoints A, B, C, and D are each not connected with two cross-section boundary line segments, the cross-section boundary line segment acquiring section 35b may not perform the verification using the verification line segments when modifying the route in Step S204 so long as the following conditions are satisfied. That is, in a case where both the endpoint C and the endpoint D, rather than the endpoint B previously forming a provisional cross-section boundary line segment, can form a new provisional cross-section boundary line segment in conjunction with the endpoint A, and the new provisional cross-section boundary line segment connecting the endpoint A with the endpoint C is determined to be not suitable as a cross-section boundary line segment as a result of the verification using verification line segments, a line segment connecting the endpoint A with the endpoint D may be acquired as a cross-section boundary line segment without going through the verification using verification line segment.

According to the embodiments of the present disclosure, the cross-section boundary line segment acquiring section 35b acquires a route passing through the endpoints of the verification line segments using a traveling salesman problem solver (Step S197), and thus the processing burden for acquiring the verification line segments can be reduced. Alternatively, the cross-section boundary line segment acquiring section 35*b* may acquire the shortest possible route passing through each of the endpoints acquired in Step S196 exactly once without using a traveling salesman problem solver.

According to the embodiments of the present disclosure, the "computer" and the "color gamut cross-section acquiring device" are the in/out-of-gamut determination device 30 that is not the MFP 20. However, the "computer" and the "color gamut cross-section acquiring device" may be the MFP 20.

According to the embodiments of the present disclosure, the "image forming apparatus" is an MFP. However, the image forming apparatus may be any non-MFP image forming apparatus such as a printer.

What is claimed is:

1. An in/out-of-gamut determination system comprising:
an image forming apparatus; and
an in/out-of-gamut determination device, wherein
the in/out-of-gamut determination device includes:
 a display;
 a storage device including a hard disk drive that stores therein an in/out-of-gamut determination program; and
 a controller that includes a central processing unit, read only memory, and random access memory and that executes the in/out-of gamut determination program stored in the storage device to function as:
 a color gamut boundary line segment acquiring section that acquires a plurality of color gamut boundary line segments for defining an outermost shell of a color gamut of the image forming apparatus;
 a cross-section boundary line segment acquiring section that acquires a plurality of cross-section boundary line segments for defining a cross-section boundary as a boundary of a cross-section of the color gamut of the image forming apparatus; and
 an endpoint acquiring section that acquires endpoints of each of the plurality of cross-section boundary line segments,
the color gamut boundary line segment acquiring section:
 prepares data of a chart to be printed that includes at least patches of colors of the outermost shell of the color gamut of the image forming apparatus;
 causes the image forming apparatus to print the chart based on the data;
 acquires Lab values of the patches of the colors of the outermost shell of the color gamut of the image forming apparatus;
 stores a correspondences between color values and the Lab values on a color-by-color basis with respect to the colors of the outermost shell of the color gamut of the image forming apparatus;
 acquires line segments each including two adjacent color values of the stored color values as endpoints thereof; and
 acquires line segments in a Lab color space corresponding to the acquired line segments in a RGB color space,
the endpoint acquiring section:
 acquires an equation of a specific plane for acquiring the cross-section of the color gamut of the image forming apparatus;
 extracts line segments in parallel with the acquired specific plane among the acquired line segments in the Lab color spacer; and
 acquires intersection points between the acquired line segments in the Lab color space and the acquired specific plane to use the intersection points as the endpoints of each of the plurality of cross-section boundary line segments,
the cross-section boundary line segment acquiring section:
 calls up a library of traveling salesman problem (TSP) solver;
 acquires the shortest possible route passing through each of the acquired endpoints exactly once using the library of the TSP solver;
 acquires line segments that make up the shortest possible route as provisional cross-section boundary line segments;
 chooses one of the acquired provisional cross-section boundary line segments as a target provisional cross-section boundary line segment;
 acquires a verification plane intersecting with the target provisional cross-section boundary line segment at a point other than the endpoints;
 acquires intersection points between the acquired line segments in the Lab color space and the acquired verification plane as endpoints of verification line segments of the line segments for verification of the target provisional cross-section boundary line segment;
 acquires the shortest possible route passing through each of the acquired endpoints of the verification line segments exactly once using the library of the TSP solver;
 acquires line segments that make up the shortest possible route as the verification line segments;
 determines whether or not the verification line segments and the target provisional cross-section boundary line segment intersect with one another;
 excludes the target provisional cross-section boundary line segment from the provisional cross-section boundary line segments and acquires the target provisional cross-section boundary line segment as a cross-section boundary line segment when determining that the acquired verification line segments and the target provisional cross-section boundary line segment intersect with one another; and
 excludes the target provisional cross-section boundary line segment from the provisional cross-section boundary line segments when determining that the acquired verification line segments and the target provisional cross-section boundary line segment do not intersect with one another, and
the controller causes the display to display a cross-section boundary using the cross-section boundary line segments, and determines whether a specified Lab value is inside or outside the cross-section boundary.

2. The color gamut cross-section acquiring device according to claim 1, wherein the verification plane intersecting with the target provisional cross-section boundary line segment at the point other than the endpoints includes one of a hue plane and a plane of constant lightness.

3. An in/out-of-gamut determination system comprising:
an image forming apparatus; and
an in/out-of-gamut determination device, wherein
the in/out-of-gamut determination device includes:
 a display;
 a storage device including a hard disk drive that stores therein an in/out-of-gamut determination program; and
 a controller that includes a central processing unit, read only memory, and random access memory and that executes the in/out-of gamut determination program stored in the storage device to function as:
a color gamut boundary line segment acquiring section that acquires a plurality of color gamut boundary line segments for defining an outermost shell of a color gamut of the image forming apparatus;
a cross-section boundary line segment acquiring section that acquires a plurality of cross-section boundary line segments for defining a cross-section boundary as a boundary of a cross-section of the color gamut of the image forming apparatus; and
an endpoint acquiring section that acquires endpoints of each of the plurality of cross-section boundary line segments,
the color gamut boundary line segment acquiring section:
prepares data of a chart to be printed that includes at least patches of colors of the outermost shell of the color gamut of the image forming apparatus;
causes the image forming apparatus to print the chart based on the data;
acquires Lab values of the patches of the colors of the outermost shell of the color gamut of the image forming apparatus;
stores a correspondences between color values and the Lab values on a color-by-color basis with respect to the colors of the outermost shell of the color gamut of the image forming apparatus;
acquires line segments each including two adjacent color values of the stored color values as endpoints thereof; and
acquires line segments in a Lab color space corresponding to the acquired line segments in a RGB color space,
the endpoint acquiring section:
acquires an equation of a specific plane for acquiring the cross-section of the color gamut of the image forming apparatus;
extracts line segments in parallel with the acquired specific plane among the acquired line segments in the Lab color spacer; and
acquires intersection points between the acquired line segments in the Lab color space and the acquired specific plane to use the intersection points as the endpoints of each of the plurality of cross-section boundary line segments,
the cross-section boundary line segment acquiring section:
calls up a library of traveling salesman problem (TSP) solver;
acquires the shortest possible route passing through each of the acquired endpoints exactly once using the library of the TSP solver;
acquires line segments that make up the shortest possible route as provisional cross-section boundary line segments;
chooses one of the acquired provisional cross-section boundary line segments as a target provisional cross-section boundary line segment;
determines whether or not two endpoints of the target provisional cross-section boundary line segment are present on a single hue plane;
acquires, as a verification plane, a hue plane intersecting with the target provisional cross-section boundary line segment at a point other than the endpoints thereof when determining that the two endpoints of the target provisional cross-section boundary line segment are not present on a single hue plane;
acquires, as the verification plane, a plane that is not a hue plane and that intersects with the target provisional cross-section boundary line segment at the point other than the endpoints thereof when determining that the two endpoints of the target provisional cross-section boundary line segment are present on the single hue plane;
acquires intersection points between the acquired line segments in the Lab color space and the acquired verification plane as endpoints of verification line segments of the line segments for verification of the target provisional cross-section boundary line segment;
acquires the shortest possible route passing through each of the acquired endpoints of the verification line segments exactly once using the library of the TSP solver;
acquires line segments that make up the shortest possible route as the verification line segments;
determines whether or not the verification line segments and the target provisional cross-section boundary line segment intersect with one another;
excludes the target provisional cross-section boundary line segment from the provisional cross-section boundary line segments and acquires the target provisional cross-section boundary line segment as a cross-section boundary line segment when determining that the acquired verification line segments and the target provisional cross-section boundary line segment intersect with one another; and
excludes the target provisional cross-section boundary line segment from the provisional cross-section boundary line segments when determining that the acquired verification line segments and the target provisional cross-section boundary line segment do not intersect with one another, and
the controller causes the display to display a cross-section boundary using the cross-section boundary line segments, and determines whether a specified Lab value is inside or outside the cross-section boundary.

* * * * *